United States Patent
Gogerty et al.

(10) Patent No.: US 7,975,632 B2
(45) Date of Patent: Jul. 12, 2011

(54) SEED PLANTER

(75) Inventors: Joseph K. Gogerty, Algona, IA (US);
Daniel M. Goldman, Des Moines, IA (US); Kent L. Hoeppner, Dallas Center, IA (US); James L. Hunter, Littleton, CO (US); Jason J. Kelsick, Alleman, IA (US); Timothy P. Meyer, Des Moines, IA (US); Joshua L. Mongan, St. Charles, IA (US); David C. Smith, Ankeny, IA (US); Loren Steenhoek, Ankeny, IA (US); Barry L. Stott, Winterset, IA (US); Timothy J. Wilhelm, Des Moines, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 0 days.

(21) Appl. No.: 12/533,134

(22) Filed: Jul. 31, 2009

(65) Prior Publication Data
US 2010/0043685 A1 Feb. 25, 2010

Related U.S. Application Data

(60) Provisional application No. 61/101,352, filed on Sep. 30, 2008, provisional application No. 61/091,119, filed on Aug. 22, 2008.

(51) Int. Cl.
*A01C 7/04* (2006.01)

(52) U.S. Cl. ........ 111/183; 111/177; 111/200; 111/900; 111/904

(58) Field of Classification Search .................. 111/177, 111/183, 900, 903, 904, 200, 100–105
See application file for complete search history.

(56) References Cited

U.S. PATENT DOCUMENTS

| | | |
|---|---|---|
| 6,928,941 B1 | 8/2005 | Sternitzke |
| 7,337,733 B2 | 3/2008 | Carr et al. |
| 2004/0007591 A1 | 1/2004 | Sut |
| 2004/0107885 A1 | 6/2004 | Carr et al. |
| 2008/0047475 A1 | 2/2008 | Stehling et al. |
| 2009/0077932 A1 | 3/2009 | Cope et al. |

OTHER PUBLICATIONS

International Search Report, Pioneer Hi-Bred International, Inc., PCT/US2009/052464 dated Sep. 23, 2009, 2 pages.

*Primary Examiner* — Christopher J. Novosad
(74) *Attorney, Agent, or Firm* — Alston & Bird LLP

(57) ABSTRACT

The invention is directed to an apparatus, method and system for a seed planter. The seed planter has a planting, dispensing and metering assembly operatively attached to a mobile supporting structure. The metering assembly has separated seed pre-staging and/or staging positions for staging pre-specified counts of seed separated from other counts in the batch and maintaining separation of the pre-specified counts of seed from other counts in the batch for planting. Alternatively, the metering assembly has separated seed staging positions for staging a batch of seed in singulated form for planting.

22 Claims, 36 Drawing Sheets

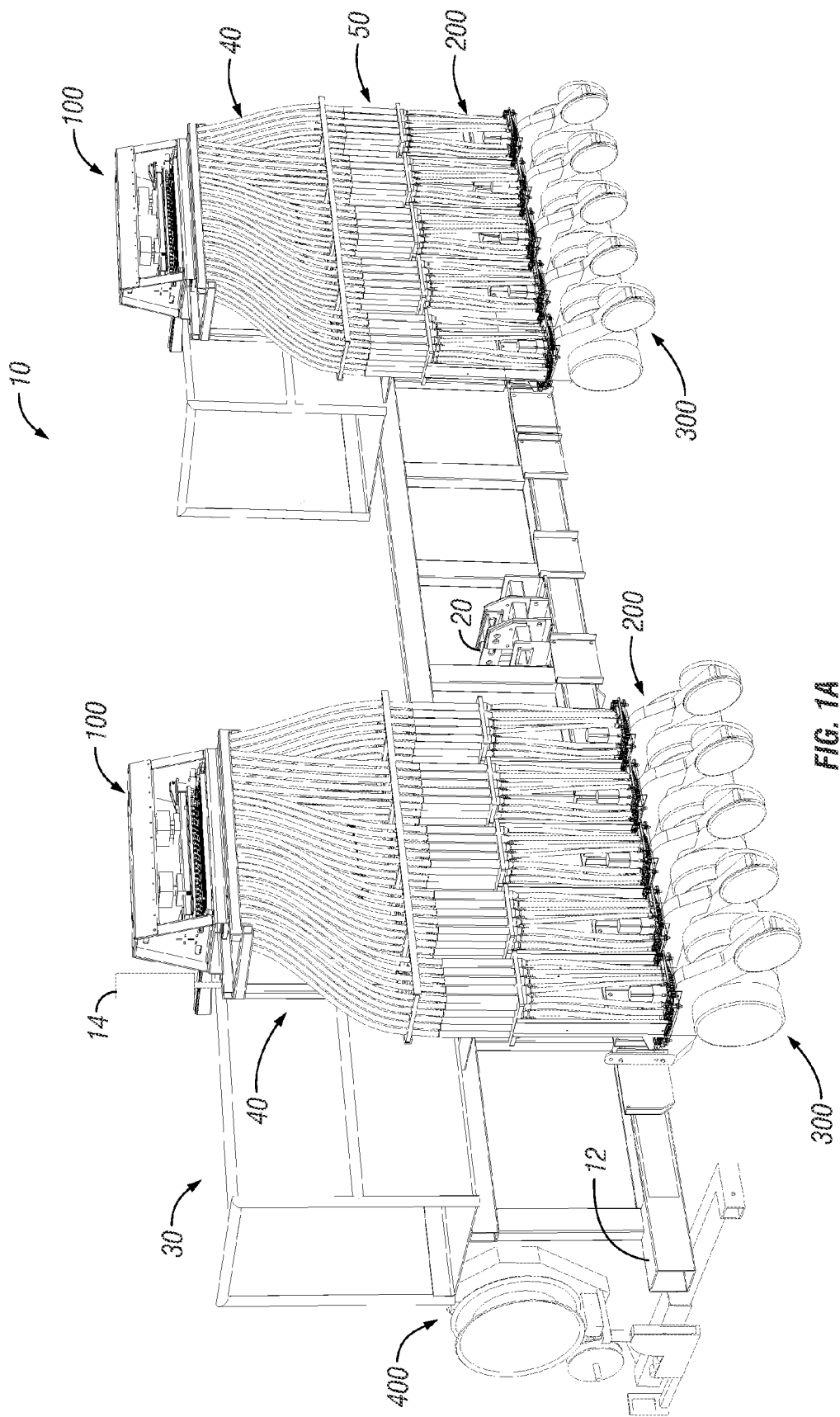

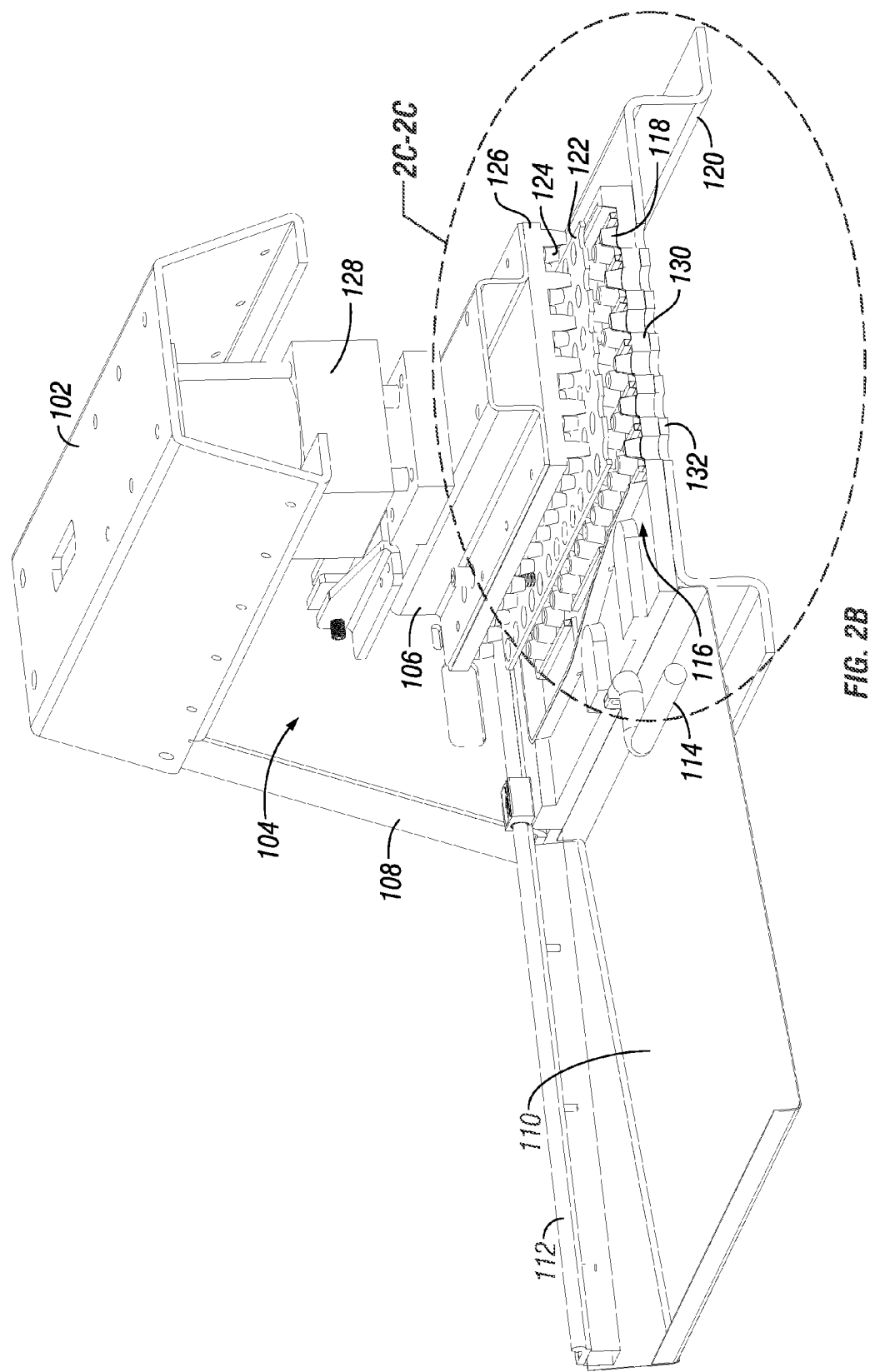

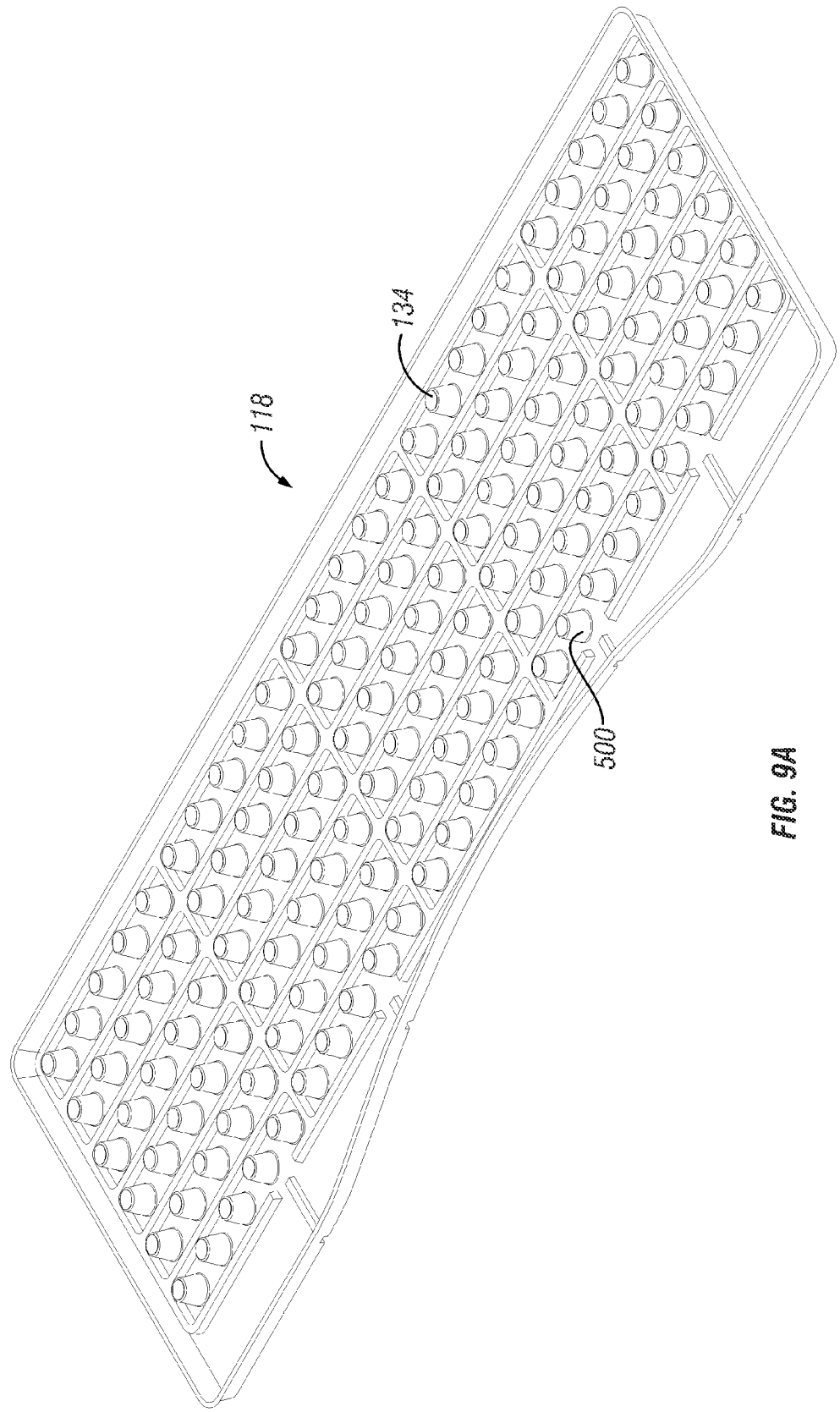

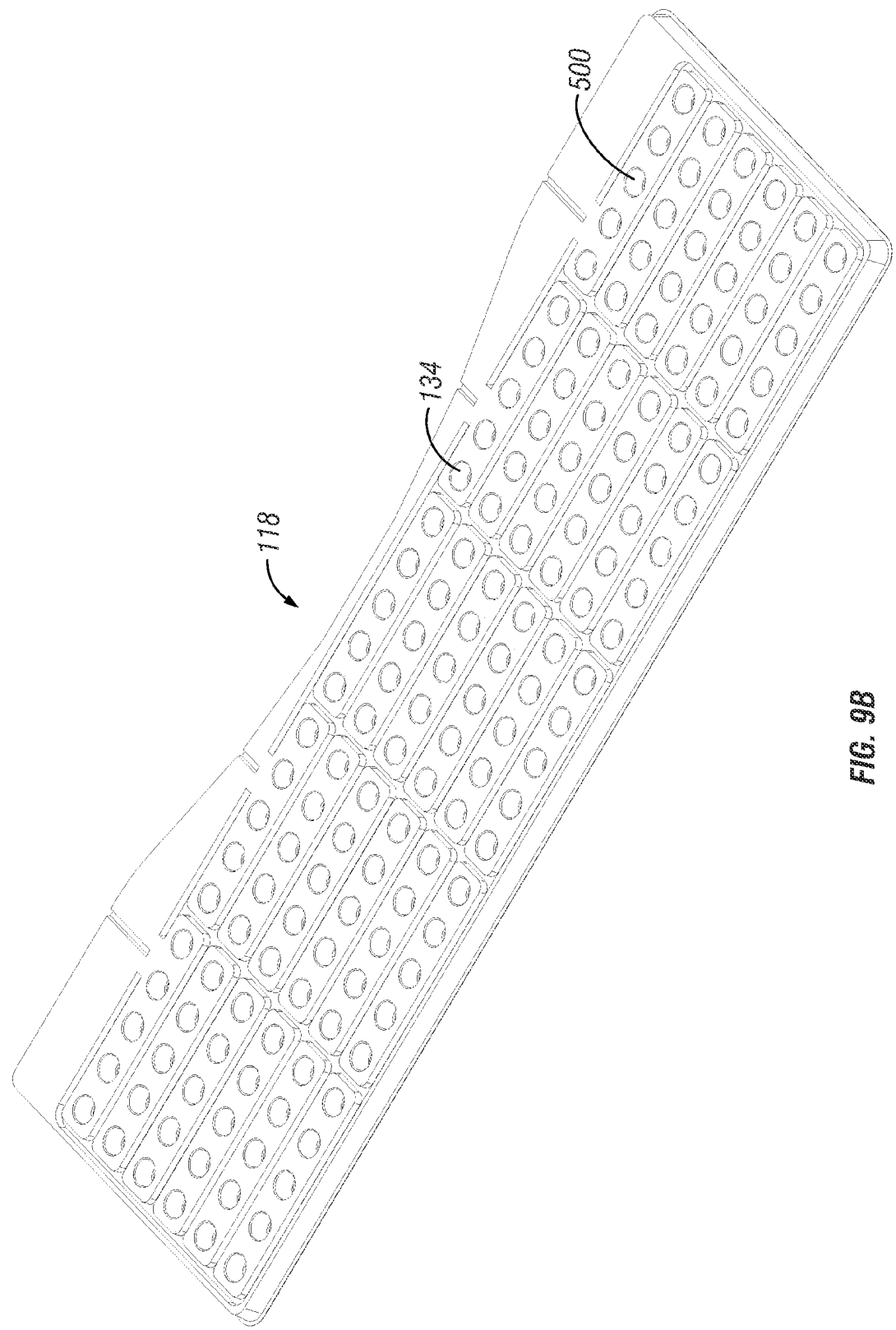

SEED PLANTER

RELATED APPLICATIONS

This application claims priority under 35 U.S.C. §119 to U.S. Patent Application No. 61/091,119, filed Aug. 22, 2008 and U.S. Patent Application No. 61/101,352, filed Sep. 30, 2008, which applications are hereby incorporated by reference in their entirety.

FIELD OF INVENTION

The present invention relates generally to a seed planter and more particularly, to an apparatus, method and system for a seed planter configured to dispense and plant from a seed carrier having seed in singulation, ensure single seed planting and correlate the resultant plant with the seed planting arrangement in the seed carrier.

BACKGROUND

Numerous attempts have been made to solve the problems of maintaining individual seed identity and ensuring the position of individual seeds within a planter so as to eliminate planting errors and interpose reliability and predictability into the seed dispensing and planting process while maintaining seed identity and a map of the planted seeds. Traditional planters plant seeds from batches and are not ideal for fields where it is necessary to plant many types of seeds within a row or set of rows or where it's desirable to control planting order/arrangement within the plot and preserve individual seed identity. For example, in research fields for hybrid seed, inbred seed, and the like, different varieties or types of seed are planted in short parallel rows. Research fields are often planted by hand and require many hours of labor. Disadvantages of this method of planting are lower germination (hand planting vs. mechanical planting), high labor, less efficient field space utilization, and lack of a robust tracking mechanism for planted seeds.

As previously mentioned, conventional planting generally involves row crop planters, grain drills, or air seeders which plant seeds in batches. None of these methods, though, solve the problem confronted in planting research fields where it is important, and necessary, to plan and control planting arrangement as well as correlate information known about the seed to the planted seed or the resultant plant to the seed. Some conventional seed planter systems have a mechanical seed meter, such as a seed plate meter, finger pickup meter and brush meters that sorts a single seed from a bulk seed supply into a seed cell where it is released over a discharge area. These conventional systems do not ensure that only one seed is released over a discharge area at the desired spacing. Further, these systems are not configured to control planting arrangement of each respective seed relative to another and the desired planted position within a plot. Other attempts to solve the problem have focused on singulating the seeds in the field or during the planting process. Some attempts have involved pre-singulating the seed in the laboratory, then recombining the seed in an envelope, and delivering the seed to the field where it is again singulated. Each of these attempts have failed to produce an efficient and reliable process for maintaining individual seed identity and ensure the position of individual seeds within a planter, and therefore in the ground when planted.

Still some systems exist wherein the seed is pre-singulated and then recombined with other seeds of a certain subgroup upon the occurrence of the planting process. These systems, however, do not allow the exact post-planting location of a single seed to be determined; rather, they can only determine the location of subgroups in a field. Furthermore, these types of systems experience a lag in delivering seed from the position at which the singulated seed is loaded into the seed intake of the planter.

In one aspect of the present invention, seed is singulated and arranged within a plurality of wells in a seed carrier according to information associated with or known about the seed and a desired seed planting arrangement.

Thus, it comes as a further object, feature and advantage of the present invention to provide an apparatus, method and system whereby some information known about the seed is used to populate the seed carrier commensurate with a desired seed planting arrangement to provide a field layout of the position of each seed planted in the field by referencing the seed carrier.

In another aspect of the present invention, seed is dispensed from the seed carrier and provided at the seed planting unit for planting commensurate with the desired seed planting arrangement and in accordance with the field layout. Management of seed movement through and position within the planting unit is accomplished in an accurate and precise manner by limiting the travel distance and time for seed movement and planting upon receipt of planting instructions.

Thus, it comes as still a further object, feature and advantage of the present invention to provide an apparatus, method and system whereby seed position and movement is managed to ensure accurate and precise planting of individual seed upon receipt of some planting instruction by staging seed in one or more staging assemblies proximate the planting unit after being dispensed from the seed carrier.

In a further aspect of the present invention, planted seed position and the resulting plant is correlated with the seed's previous position within the seed carrier and any information known and associated with the seed and used to create the desired seed planting arrangement.

Thus, it comes as another object, feature and advantage of the present invention to provide an apparatus, method and system whereby the relationship between the seed's position within the seed carrier and planting position within the field are preserved to accurately and precisely correlate information about the resultant plant with the seed planting arrangement within the seed carrier and any information relied upon to configure seed within the seed carrier according to some desired seed planting arrangement.

SUMMARY

One or more of the foregoing objects, features or advantages may be achieved by a seed planter as disclosed. The seed planter includes a mobile supporting structure, a planting assembly operatively attached to the mobile supporting structure, a dispensing assembly operatively attached to the mobile supporting structure for dispensing a batch of seed, and a metering assembly operatively attached to the mobile supporting structure. The metering assembly includes seed staging components having separated seed pre-staging and/or staging positions for staging pre-specified counts of seed separated from other counts in the batch and maintaining separation of the pre-specified counts of seed from other counts in the batch.

One or more of the foregoing objects, features or advantages may additionally be achieved by a method for planting seed. The method for planting seed includes providing a seed planter having a planting assembly, a dispensing assembly and a metering assembly operatively attached to a mobile supporting structure, loading the dispensing assembly with a batch of seed having one or more sets of pre-specified counts of seed separated from other counts in the batch, dispensing the pre-specified counts of seed in the batch from the dispensing assembly, maintaining separation of the specified counts of seed through the metering assembly, and planting the specified counts of seed with the planting assembly.

One or more of the foregoing objects, features or advantages may additionally be achieved by a seed planter system. The seed planter system includes planting means for planting seed, seed carrying means for carrying seed in singulation, dispensing means for dispensing singulated seed from seed carrying means, and staging means for staging seed in singulation at the planting means.

BRIEF DESCRIPTION OF THE DRAWINGS

While the specifications concludes with claims particularly pointing out and distinctly claiming the invention, it is believed that the present invention will be better understood from the following description taken in conjunction with the accompanying drawings in which:

FIG. 1A is a perspective view of the seed planter according to an exemplary embodiment of the present invention;

FIG. 2B is a sectional view of the dispensing unit taken along line 2B-2B in FIG. 2A;

FIG. 9A is a perspective view of a seed carrier according to an exemplary aspect of the present invention;

FIG. 9B is a bottom perspective view of the seed carrier shown in FIG. 9A;

DETAILED DESCRIPTION

Figure 1B:
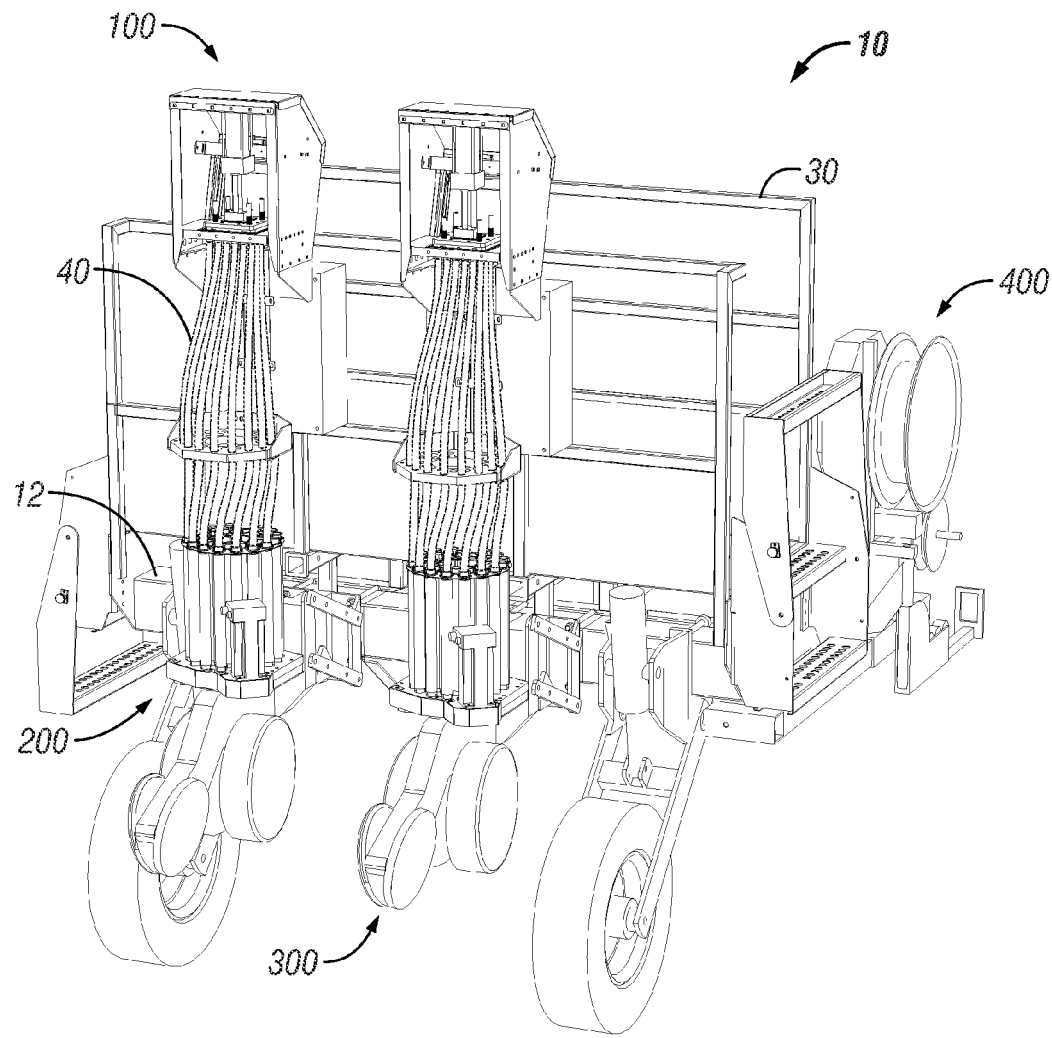
FIG. 1B is a perspective view of the seed planter according to another exemplary embodiment of the present invention.

The following description is merely exemplary in nature and is not intended to limit the present disclosure, application, or uses. For a better understanding of the invention, several exemplary embodiments will now be described in detail. Reference will be taken from time-to-time to the appended drawings. Reference numerals will be used to indicate certain parts and locations throughout the Figures. These same reference numerals will be used to indicate the same or similar parts and locations throughout the Figures unless otherwise indicated.

The present invention should not be construed as being limited to a seed planter apparatus, method and system. The present invention contemplates and claims other concepts upon which drive the design and functionality of the resultant seed planter described and claimed hereinafter. According to one exemplary aspect of the present invention, seed is singulated and arranged within a plurality of wells in a seed carrier according to information associated with or known about the seed and a desired seed planting arrangement. Thus, some information known about the seed is used to populate the seed carrier commensurate with the desired seed planting arrangement to provide a field layout of the position of each seed planted in the field by referencing the seed carrier. In another exemplary aspect of the present invention, seed is dispensed from the seed carrier and provided at the seed planting unit for planting commensurate with the desired seed planting arrangement and in accordance with the field layout. Management of seed movement through and position within the planting unit is accomplished in an accurate and precise manner by limiting the travel distance and time for seed movement and planting upon receipt of planting instructions. Thus, seed position and movement is managed to ensure accurate and precise planting of individual seed upon receipt of some planting instruction by staging seed in one or more staging assemblies after being dispensed from the seed carrier. In a further exemplary aspect of the present invention, planted seed position and the resulting plant is correlated with the seed's previous position within the seed carrier and any information known and associated with the seed and used to create the desired seed planting arrangement. Thus, the relationship between the seed's position within the seed carrier and planting position within the field are preserved to accurately and precisely correlate information about the resultant plant to the seed planting arrangement within the seed carrier and any information relied upon to configure seed according to the desired seed planting arrangement. The present invention contemplates a seed planter that accomplishes at least all the aforementioned objects, features and advantages as well as any other objects, features or advantages that are within the scope and concepts of the present invention.

Apparatus

A seed planter 10 according to an exemplary aspect of the present invention is disclosed and shown in FIG. 1A and FIG. 1B. The seed planter 10 includes several assemblies, sub-assemblies and components mounted on a mobile supporting structure 12. Skilled artisans will recognize that the mobile supporting structure 12 can be an agricultural toolbar, such as for example a John Deere 1700 Integral Rigid Planter. The mobile supporting structure 12 could be mobilized using conventional towing implements such as a tractor attached to the seed planter 10 using hitch 20, such as a mounted, semi-mounted or drawn hitch. Skilled artisans will recognize that the mobile supporting structure 12 may be configured to be piloted from an onboard operator or operated autonomously. For example, the seed planter 10 could include a means for driving and navigating itself or with input from an operator. The seed planter 10 also includes a plurality of planting units 300 attached to a mobile supporting structure 12. Each planting unit includes a seed intake 302 (see FIG. 5C). Skilled artisans will recognize that the planting units 300 can be a commercially available row planting unit, such as for example a John Deere MaxEmergeXP row unit. The seed planter 10, as shown in FIG. 1A and FIG. 1B, includes a device for providing a planting instruction or tripping the planting process. In one exemplary aspect, the seed planter 10 includes a cable winder 400 for providing the planting instruction or tripping the planting process. The cable winder is a mechanism that automatically unwinds the planting cable when traveling up the field and rewinds the cable on the way back. The cable winder 400 is a commercially available unit, such as for example an Almaco Cable Winder System (e.g., Cable Winder System, Almaco, Nevada, Iowa). Further detail regarding the Almaco Cable Winder System can be found at U.S. Pat. No. 7,337,733, issued Mar. 4, 2008, which is incorporated by reference herein. Similarly, the cable winder could be replaced with other check head systems. Those skilled in the art will also recognize that other devices could be used to issue planting instructions or trip the planting process. For example, a spatial recognition device could be programmed to recognize the relative position of seed planter 10 within the field or research plot to know when to provide a planting instruction or when to trip the planting process. Other spatial indicators could be used to indicate when to issue a planting instruction, such as spatial markers, flags or indicators. Skilled artisans will appreciate that a geospatial device could be used to ascertain the position of seed planter 10 relative to a desired seed planting position and issue a planting instruction to seed planter 10 or trip the process for planting a seed.

The seed planter 10 also includes, in addition to the aforementioned commercially available assemblies, a dispenser 100 for use in combination with a seed carrier, such as seed tray 118 shown in FIGS. 4A-B, 9A-B and 10A-B, holding a batch of seed in singulation arranged for planting. Although the term seed tray is used, the present invention contemplates any type of seed carrier suitable for separating desired quantities of seed from other seed in a batch of seed, such as for example where seed of a batch are singulated in wells separate from other seed in the batch or where one or more sets of pre-specified counts of seed are separated into compartments/wells from other counts in the batch. A user interface 14 may be included with dispenser 100 to alert an operator of the status of the dispenser 100, seed planter 10, rotary seed plate 224, servomotor 208, slide gate cylinder 216, cable winder 400, speed of planter 10, a spatial/geospatial positioning system (GPS) and/or other location determining devices, and/or identification of carrier 118 from a barcode reader, RFID tag, a label, a sticker, an inscription, an optical character, or other scannable or readable labels.

The seed planter 10 has the advantage of controlling the separation between rows by changing the distance between planting units 300. Unlike planters in the prior art, seed planter 10 is adaptable to a multiple row configuration planter where separation between each planting unit 300 is capable of being minimized (meaning more planting units 300 on the same size toolbar 12) to provide tighter spaced rows, and thus more rows. By way of example only, the seed planter 10 of the present invention is adaptable so that planting units 300 can be spaced on toolbar 12 as close as 14.5 inches apart.

The present invention further contemplates that seed planter 10 may include one or more seed tape injection assemblies (e.g., Andros Engineering Corp., Paso Robles, Calif.) operatively attached to the toolbar 12, loading platform 30 and/or the planting unit 300 for injecting commercially available drip tape into the ground adjacent the row of plantings. The present invention also contemplates that seed planter 10 may include one or more fertilizer applicator assemblies (e.g., Gandy Company, Owatonna, Minn.) operatively attached to the toolbar 12, loading platform 30 and/or the planting unit 300 for metering granular fertilizers into the ground adjacent the row of plantings. Application of fertilizer could occur simultaneously with injection of the seed tape. These systems could also be used to apply other insecticides, herbicides or fertilizers to the plant during or after planting. The present invention contemplates systems aboard seed planter 10 for providing energy, whether electrical, pneumatic or hydraulic, including usage of one system to drive another. One or more of the systems aboard the seed planter 10 could be powered in full or in part by a hydraulic or power train output (PTO) from a tractor or other towing implement. For example, hydraulic outputs from a tractor towing the seed planter 10 may be used to power a pneumatic system such as a hydraulic compressor pump (e.g., Model SHD-21A, American Eagle Accessories Group, Garner, Iowa) and/or an electrical system (e.g., an alternator) aboard the seed planter 10 for use in operating one or more of the systems of the seed planter 10.

A dispenser 100 according to several exemplary embodiments of the present invention are shown and illustrated in FIGS. 2A-4B. The seed planter 10 also includes a seed metering unit 200 in communication with dispenser 100 by way of the tubing assembly 50. A seed metering unit 200 according to several exemplary aspects of the present invention are shown and illustrated in FIGS. 5A-8D.

FIGS. 2A-E show one embodiment of the dispenser 100 of the current invention. The dispenser 100 includes a top frame 102, bottom frame 120, and at least one end frame 108. The dispenser 100 further includes a press 104 comprising at least one ram 128, a press plate 106, an actuator 138, a plate 126, and a plurality of pins 124. The press plate 106 is attached to plate 126 and ram 128 such that the force exerted by the ram 128 is translated to the plate 126 and plurality of pins 124 ganged to the plate 126. The downward force exerted on ram 128 moves plate 126 downward. The plurality of pins 124 ganged to plate 126 are arranged in corresponding pattern with the plurality of wells 134 in the seed tray 118. Moreover, the pins 124 are ganged together on the press 104 to move simultaneously to dispense the entire batch of pre-singulated seed at once from the seed tray 118. The present invention also contemplates a configuration of dispenser 100 wherein the pins 104 may be configured in plate 126 to move independently of the other to dispense selected seed from seed tray 118 according to a desired dispensing sequence or according to a desired seed planting arrangement. The receptacle 116 is configured to receive seed tray 118. The receptacle 116 holds seed tray 118 and is oriented in corresponding position relative to press 104. The receptacle 116 may include a handle 114 for gripping. The receptacle 116, much like a drawer, may be configured to slide along track 112 such that receptacle 116 may be drawn outward and made accessible to the user at a corresponding position with tray 110. The receptacle 116 is positionable within press 104. In the press 104, receptacle 116 aligns seed tray 118 with pins 124 ganged on plate 126. A locating guide 122 having a plurality of apertures 140 aligns the plurality of pins 124 (e.g., kick-off pins) commensurate with the plurality of wells 134 in seed tray 118 to ensure that pins 124 directly impact plurality of wells 134 and that seed within each of wells 134 is not caught-up or trapped within the collapsed walls of each well 134. The locating guide 122 has dual functionality, first the locating guide 122 insures accuracy and reliability of seed separation from well 134 during the dispensing process, and second, the locating guide 122 strips seed carrier 122 from plurality of pins 124 on press 104 in the case where seed tray 118 wants to move with press 104. In a preferred form, locating guide 122 is spring-biased away from plate 126 to provide the aforementioned dual functionality. For example, locating guide 122 makes contact with seed tray 118 in advance of or simultaneous with contact from the plurality of pins 124 and remains in contact with seed tray 118 through the entire dispensing process. Similarly, the biasing of locating guide 122 away from plate 126 allows the biasing force exerted on locating guide 122 to strip seed tray 118 from plurality of pins 124.

Figure 2A:
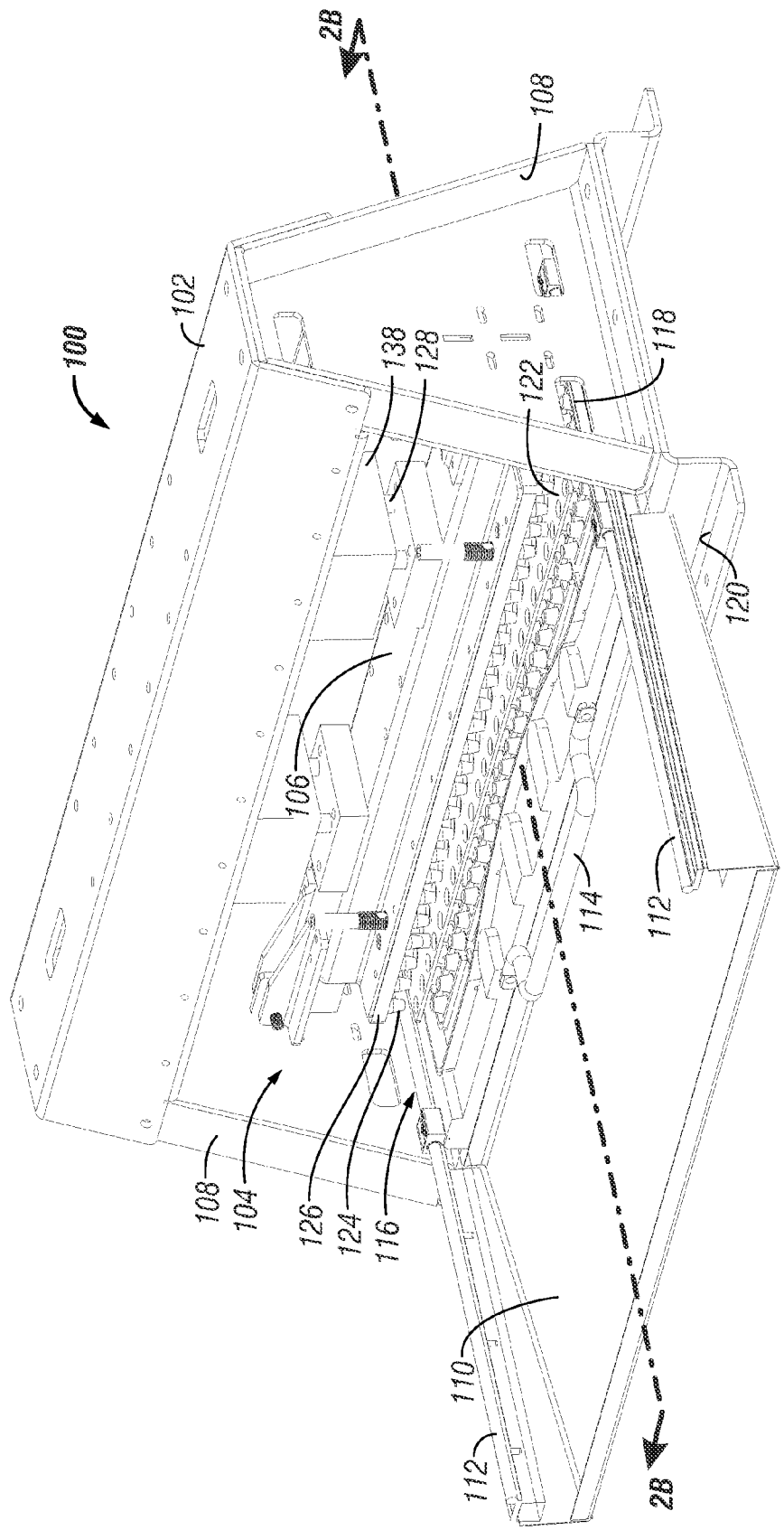
FIG. 2A is a perspective view of the dispensing unit shown in FIG. 1A according to an exemplary embodiment of the present invention.
Figure 2C:
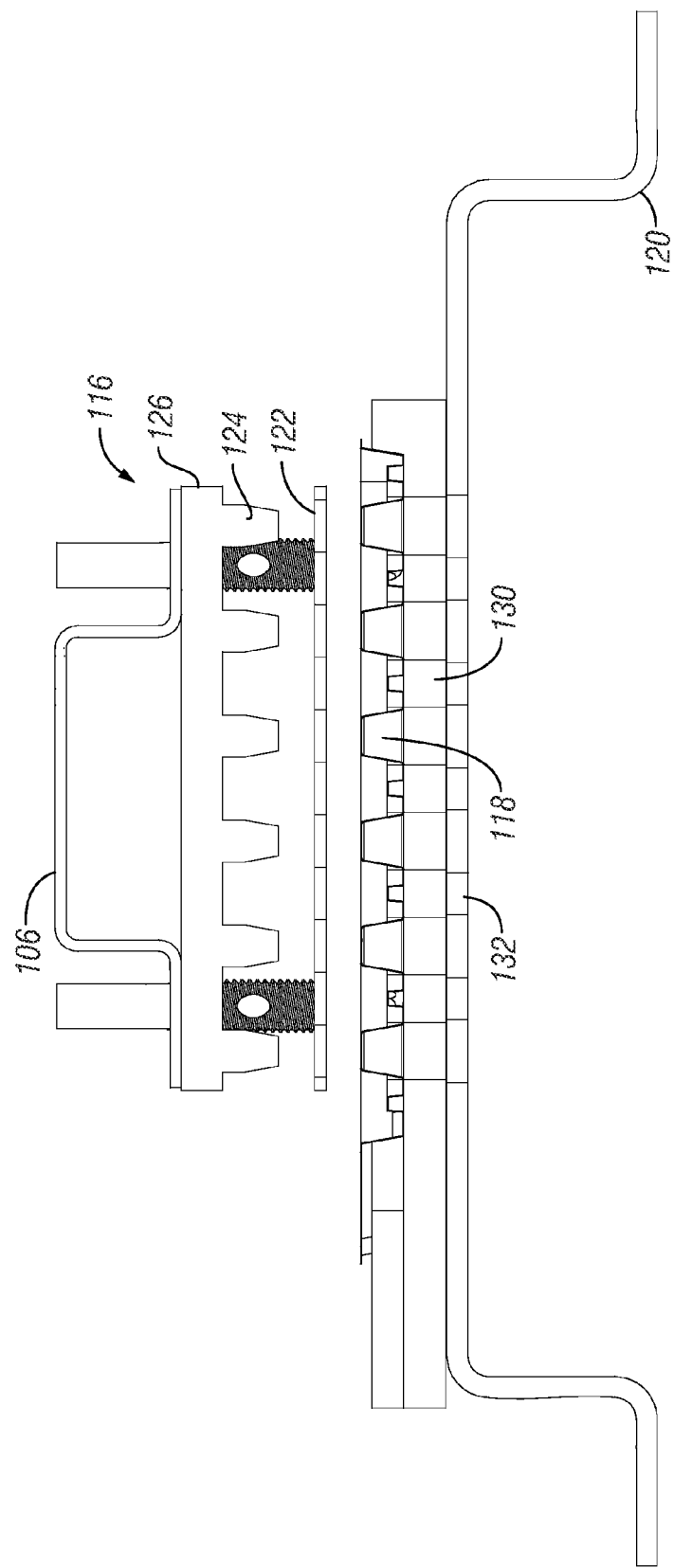
FIG. 2C is an enlarged view taken along line 2C-2C in FIG. 2B
Figure 2D:
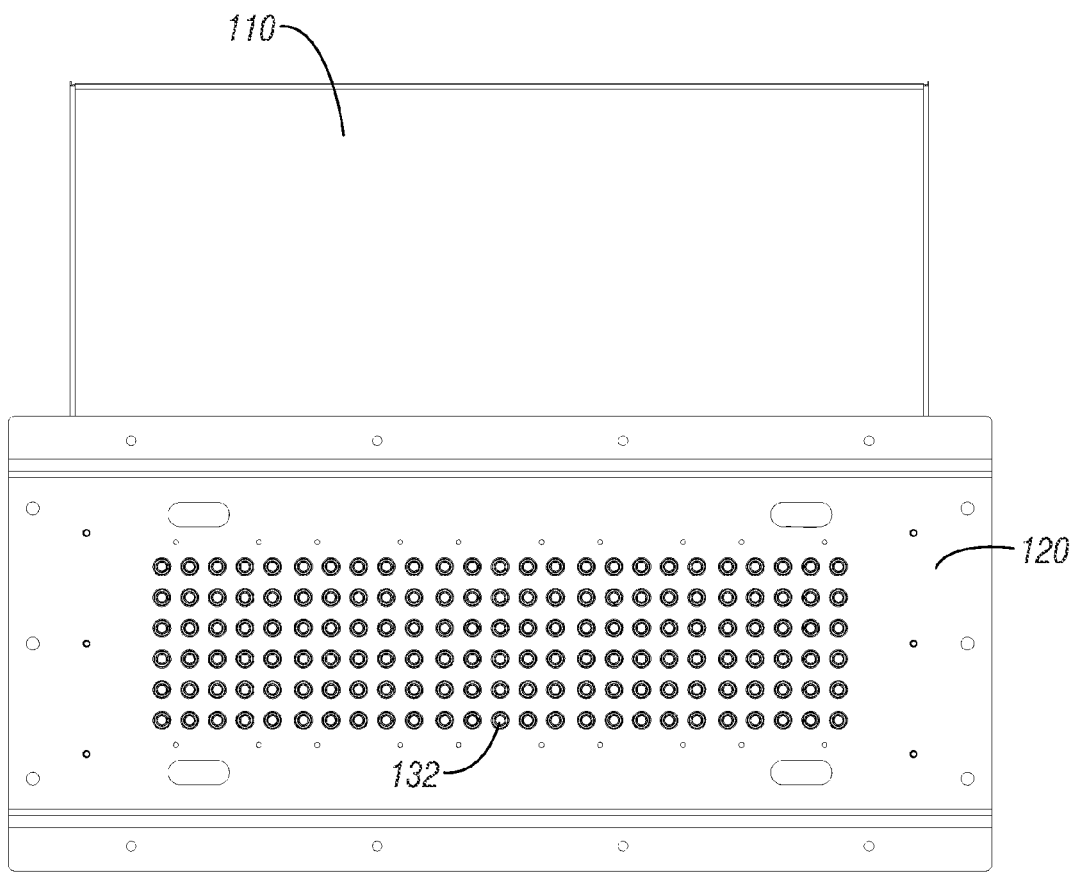
FIG. 2D is bottom view of the dispensing unit shown in FIG. 2A.
Figure 2E:
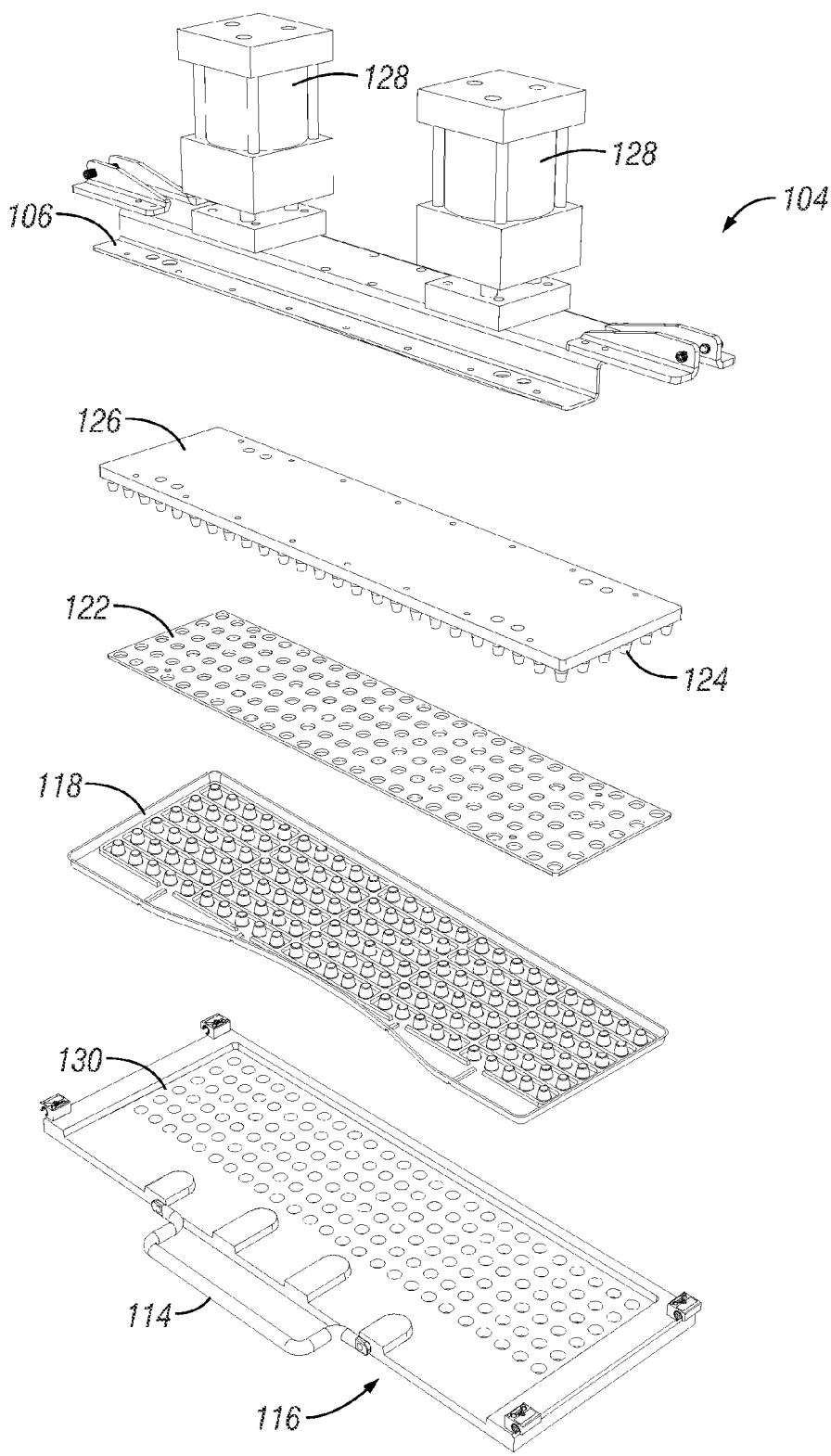
FIG. 2E is an exploded view of the dispensing unit shown in FIG. 2A.

Referring to FIG. 2B, a sectional view of the dispenser 100 taken along line 2B-2B in FIG. 2A is shown. FIG. 2C illustrates an enlarged view taken along line 2C-2C in FIG. 2B. FIGS. 2B-C illustrate the alignment between plate 126 with plurality of pins 124, locating guide 122 with plurality of apertures 140, seed tray 118 with plurality of wells 134, receptacle 116 with plurality of apertures 130, and bottom section 120 with plurality of apertures 132. The receptacle 116 includes a plurality of apertures 130 in corresponding pattern with plurality of pins 124 and plurality of wells 134 in seed tray 118. Each aperture 140 in locating guide 122 is aligned and configured to surround each well 134 in seed tray 118 in the dispensing process. Similarly, each pin 124 is aligned and configured to pass through each aperture 140 in locating guide 122 to engage and dispense seed from each well 134 in seed tray 118. Each well 134 in seed tray 118 is aligned and configured to be in communication with apertures 130 and 132 in receptacle 116 and bottom section 120, respectively. FIG. 2D shows a bottom view of the dispenser 100 shown in FIG. 2A. In particular, FIG. 2D illustrates bottom of tray 110, bottom frame 120, and plurality of apertures 132 in bottom frame 120. An exploded view of the dispenser 100 is shown in FIG. 2E. The relationship between the press 104 assembly, locating guide 122, seed tray 118, and receptacle 116 is further illustrated. The top frame 102, end frame 108, tray 110, track 112, bottom frame 120, and bottom frame aperture 132 is also shown.

Figure 2F:
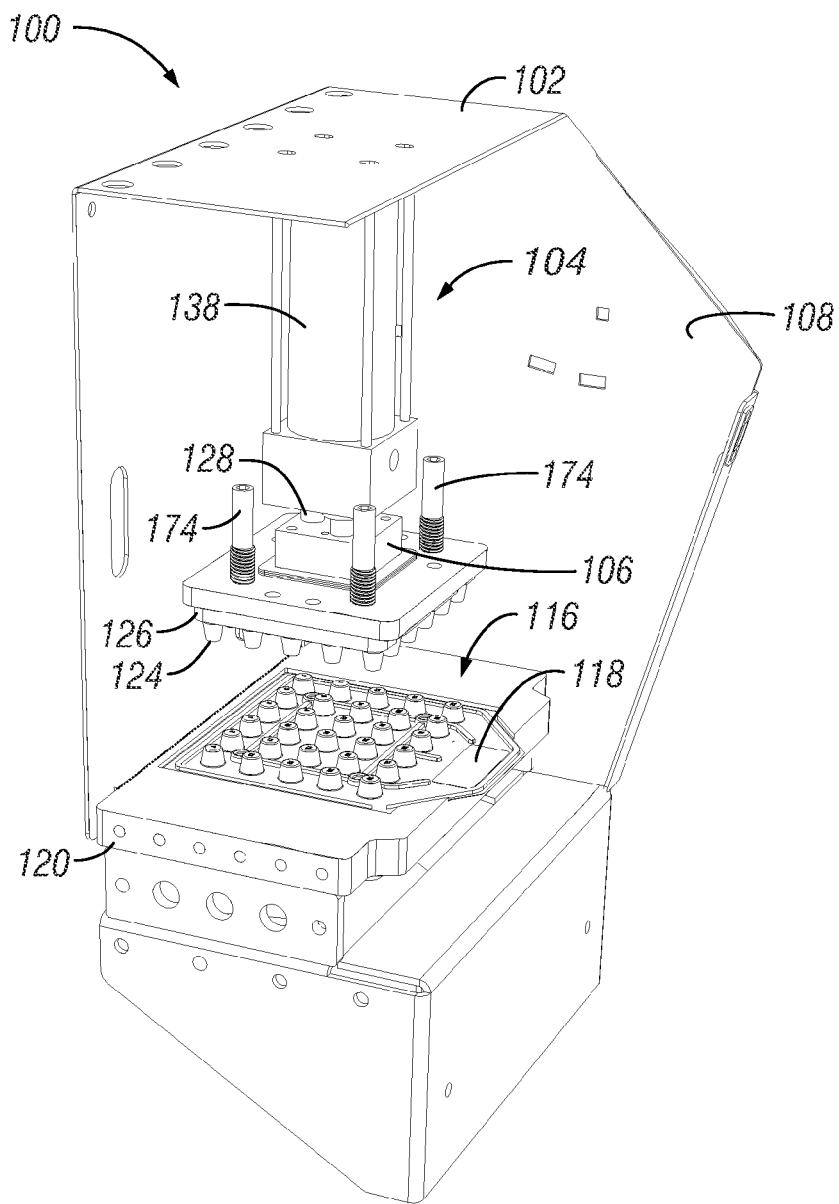
FIG. 2F is a perspective view of the dispensing unit shown in FIG. 1B according to an exemplary embodiment of the present invention.

Referring now to FIG. 2F, an alternative embodiment of dispenser 100 is disclosed. In this embodiment, a seed tray 118, such as a 30-well seed tray 118 (shown in FIGS. 10A-B), is placed into a receptacle 116. Press 104 travels downwardly to dispense seeds from seed tray 118. The press 104 includes a ram 128, a plate 126, and pins 124 ganged to plate 126 similar to dispenser 100 shown in FIGS. 2A-E. After the seeds have been dispensed they travel into a plurality of conduit 40 (shown in FIG. 1B as a single conduit 40 for purposes of clarity). The dispenser 100 is surrounded by a top frame 102, bottom frame 120, and end sections 108 (one end section 108 is not shown for purposes of illustration of dispenser 100). Press 104 of dispenser 100 could include kick-off pins for separating seed tray 118 from pins 124.

Figure 3A:
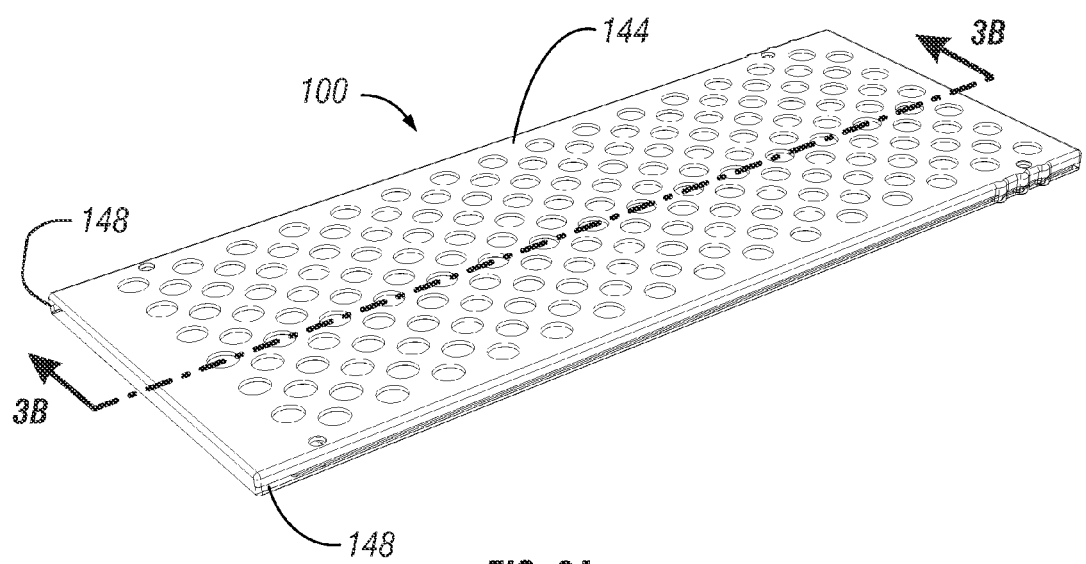
FIG. 3A is a perspective view of a dispensing unit according to another exemplary embodiment of the present invention.
Figure 3B:
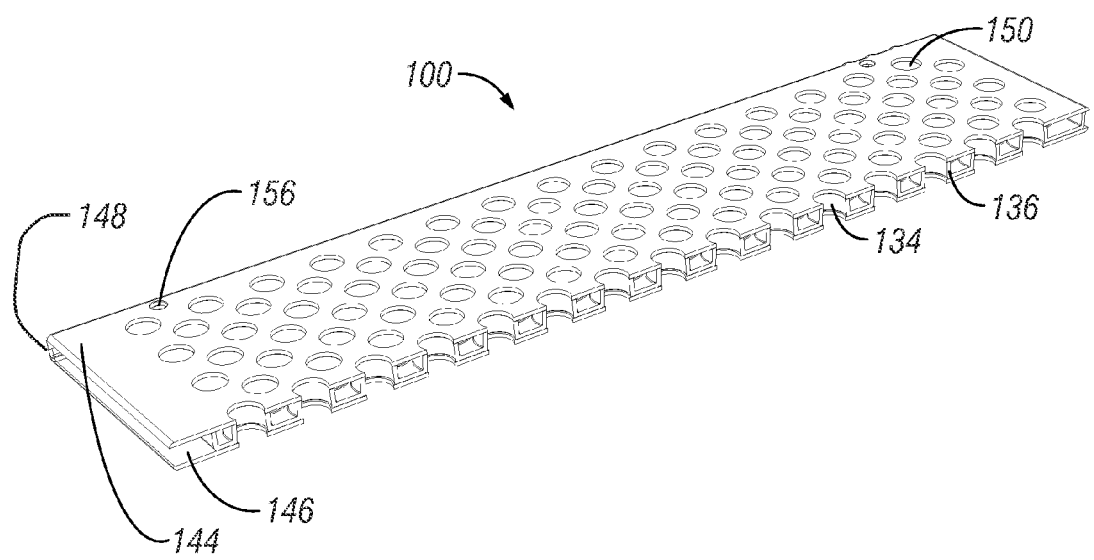
FIG. 3B is a sectional view of the dispensing unit taken along line 3B-3B in FIG. 3A.
Figure 3C:
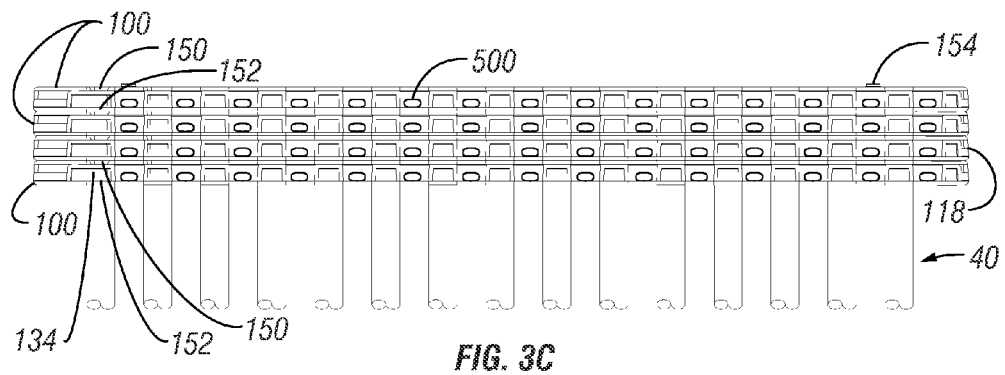
FIG. 3C is a front elevation view of several of the dispensing units shown in FIG. 3B stacked together according to an exemplary aspect of the present invention.
Figure 3D:
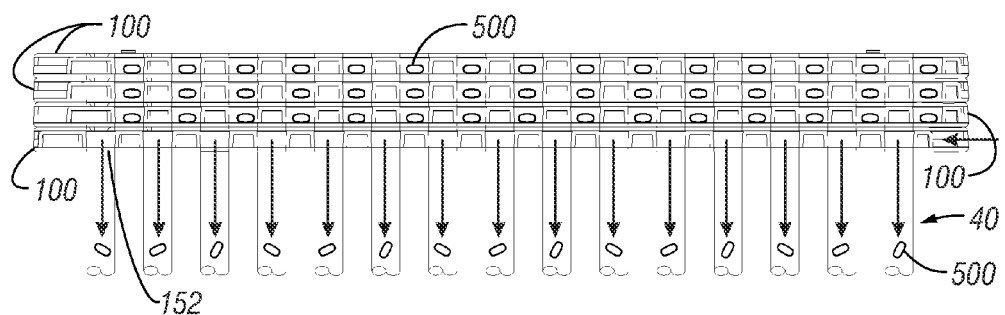
FIG. 3D is a front elevation view of the dispensing unit shown in FIG. 3C illustrating seed dispensing according to one aspect of the present invention.
Figure 3E:
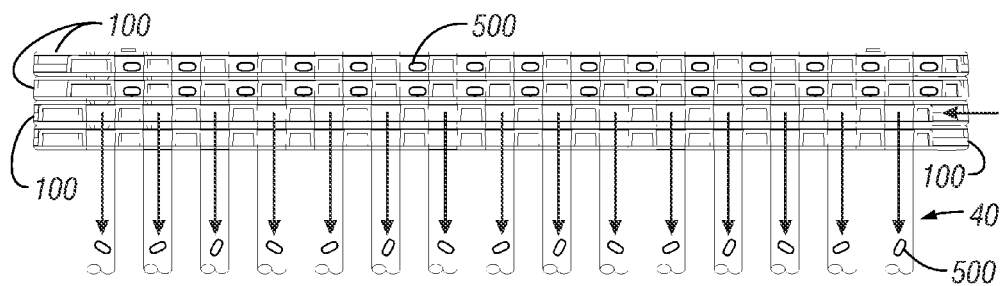
FIG. 3E is a front elevation view of the dispensing units shown in FIG. 3D illustrating another iteration of seed dispensing according to an exemplary aspect of the present invention.

FIGS. 3A-E illustrate a seed dispenser according to another exemplary aspect of the present invention. Dispenser 100 includes a top wall 144 and bottom wall 146 connected by sidewalls 148 forming a hollow rectangular structure housing slide plate 136. Top wall 144 includes a plurality of apertures 150 arranged in corresponding pattern to a plurality of apertures 152 in bottom wall 146. Slide plate 136 includes a plurality of wells 134 in corresponding pattern to the plurality of apertures 150 in top wall 144 and plurality of apertures 152 in bottom wall 146. Slide plate 136 is moveable between a first and second position. In the first position, plurality of wells 134 are aligned with plurality of apertures 150 in top wall 144 and a plurality of apertures 152 in bottom wall 146. In the second position, plurality of wells 134 in slide plate 136 are obstructed by top wall 144 and bottom wall 146. Each of plurality of wells 134 are adapted to hold seed 500 when slidable plate 136 is in the second position such that plurality of wells 134 are obstructed by top wall 144 and bottom wall 146. Thus, a seed, such as seed 500, could be included in each well 134 and stored in well 134 until dispensed from dispenser 100 by moving slidable plate 136 so that each well 134 is in communication with plurality of apertures 152 in bottom wall 146. Dispensers 100 are adapted to stack one on top of another as best illustrated in FIGS. 3C-E. Top wall 144 may include one or more pin seats 156 adapted to receive pins 154 so as to secure one dispenser 100 relative to another dispenser 100 when the two are stacked one on top of the other. An actuator (not shown) may be used to shuttle slide plate 136 between first and second positions to thereby move plurality of wells 134 in communication with plurality of apertures 150 in top wall 144 and plurality of apertures 152 in bottom wall 146.

Figure 4A:
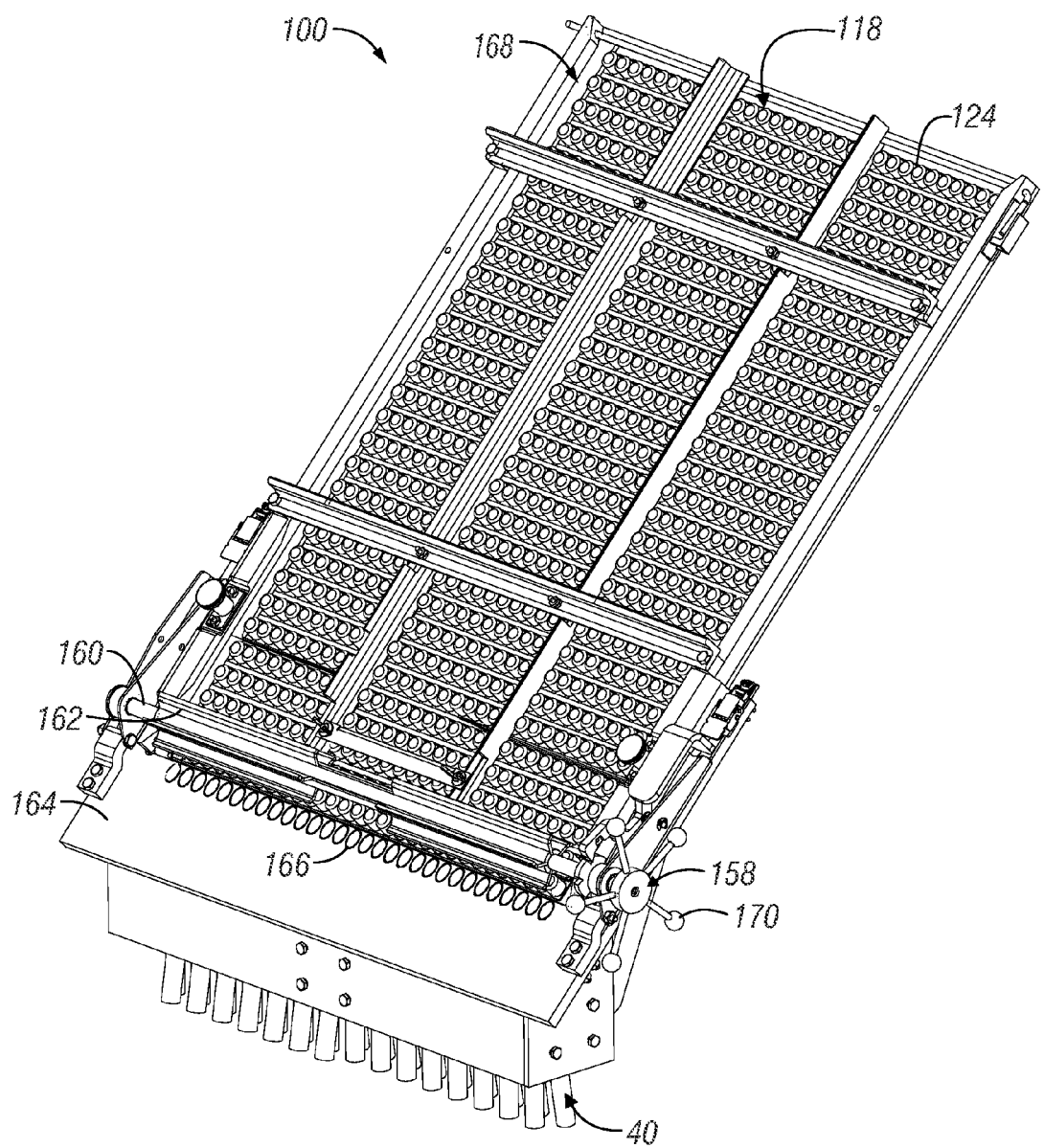
FIG. 4A is a perspective view of a dispensing unit according to another exemplary aspect of the present invention.
Figure 4B:
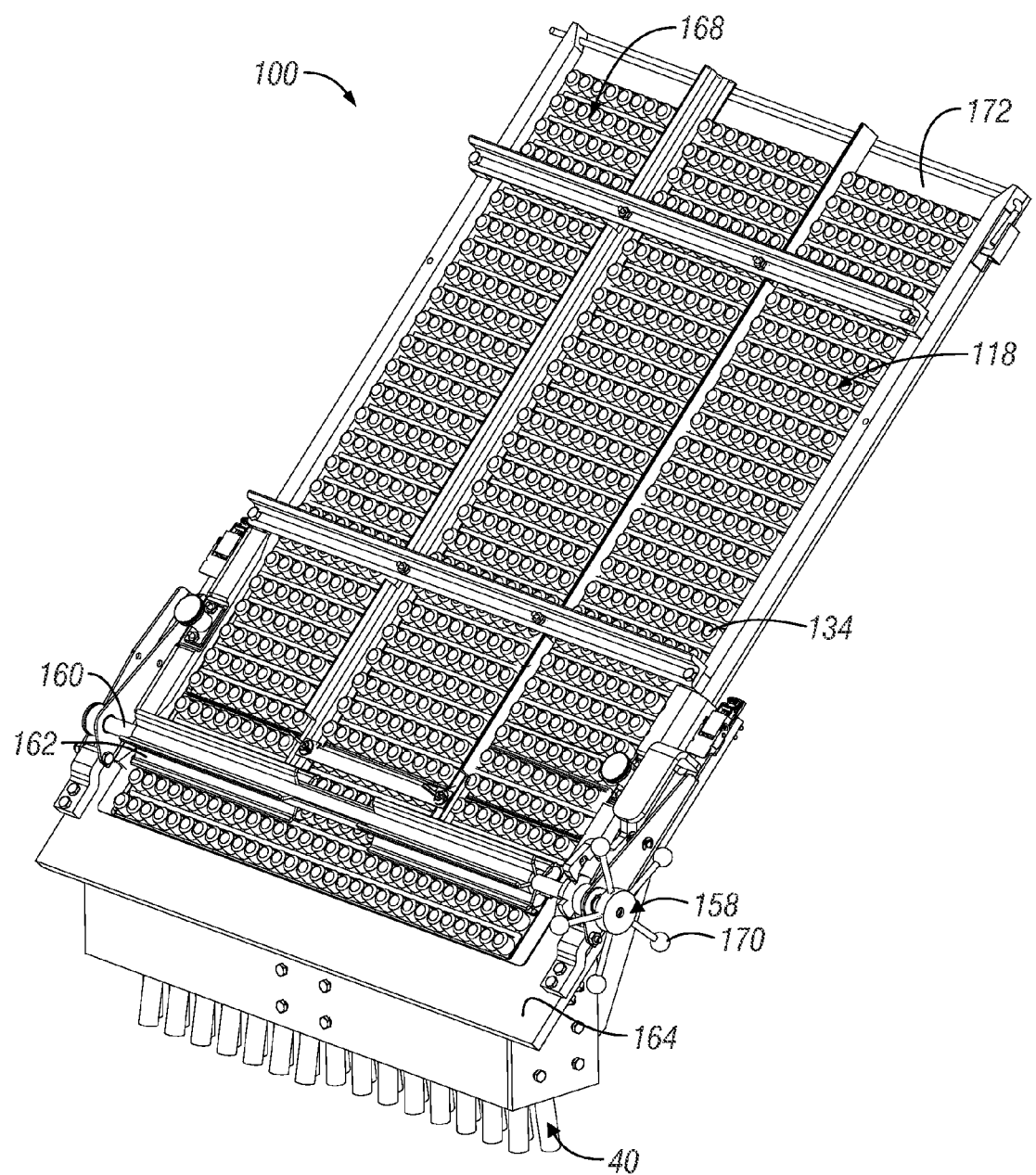
FIG. 4B is a perspective view of the dispensing unit shown in FIG. 4A illustrating seed dispensing according to an exemplary aspect of the present invention.

FIGS. 4A-B illustrate a dispenser 100 according to another exemplary aspect of the present invention. Dispenser 100 includes a receptacle tray 168 attached to manifold 164. Receptacle tray 168 is adapted to receive seed tray 118 as illustrated in FIGS. 4A-B. Dispenser 100 includes shuttle 158 having a drive 170 attached to shaft 160. Shaft 160 includes a plurality of paddles 162 spaced longitudinally along the outer peripheral surface of shaft 160 as illustrated in FIGS. 4A-B. Paddles 162 mounted on shaft 160 are spaced along their outer edges at a sufficient distance so as to span across a row of wells 134 in seed tray 118. Seed tray 118 is iterated through dispenser 100 by rotation of shuttle 158. Manifold 164 includes a plurality of apertures 166 arranged in corresponding pattern to the plurality of wells 134 within seed tray 118. Apertures 166 in manifold 164 are in communication with plurality of conduit 40. In the exemplary aspect illustrated in FIGS. 4A-B, manifold 164 includes a pair of row of apertures 166 in communication with a pair or row of conduit 40. Those skilled in the art can appreciate that the number of apertures 166 in manifold 164 may be increased or decreased to correspond with the number of conduit 40. For example, manifold 164 could be configured with several rows of apertures 166 corresponding with and in communication with a plurality of rows of conduits 40. Receptacle tray 168 is configured with a cover plate 172 that acts like a lid or cover over the openings of the plurality of apertures in seed tray 118 when the thin slide plate is moved from the covering position relative to the plurality of wells 134 in seed tray 118. Thus, as seed tray 118 is iterated forward using shuttle 158, cover plate 172 remains in the same position such that the plurality of wells being iterated forward are no longer covered by cover plate 172 but by manifold 164. Wells 134 in seed tray 118 (when iterated forward) move into communication with apertures 166 in manifold 164 to dispense seed into apertures 166 using gravity. Seed is then communicated through apertures 166 in communication with plurality of conduit 40 by gravity.

Figure 5A:
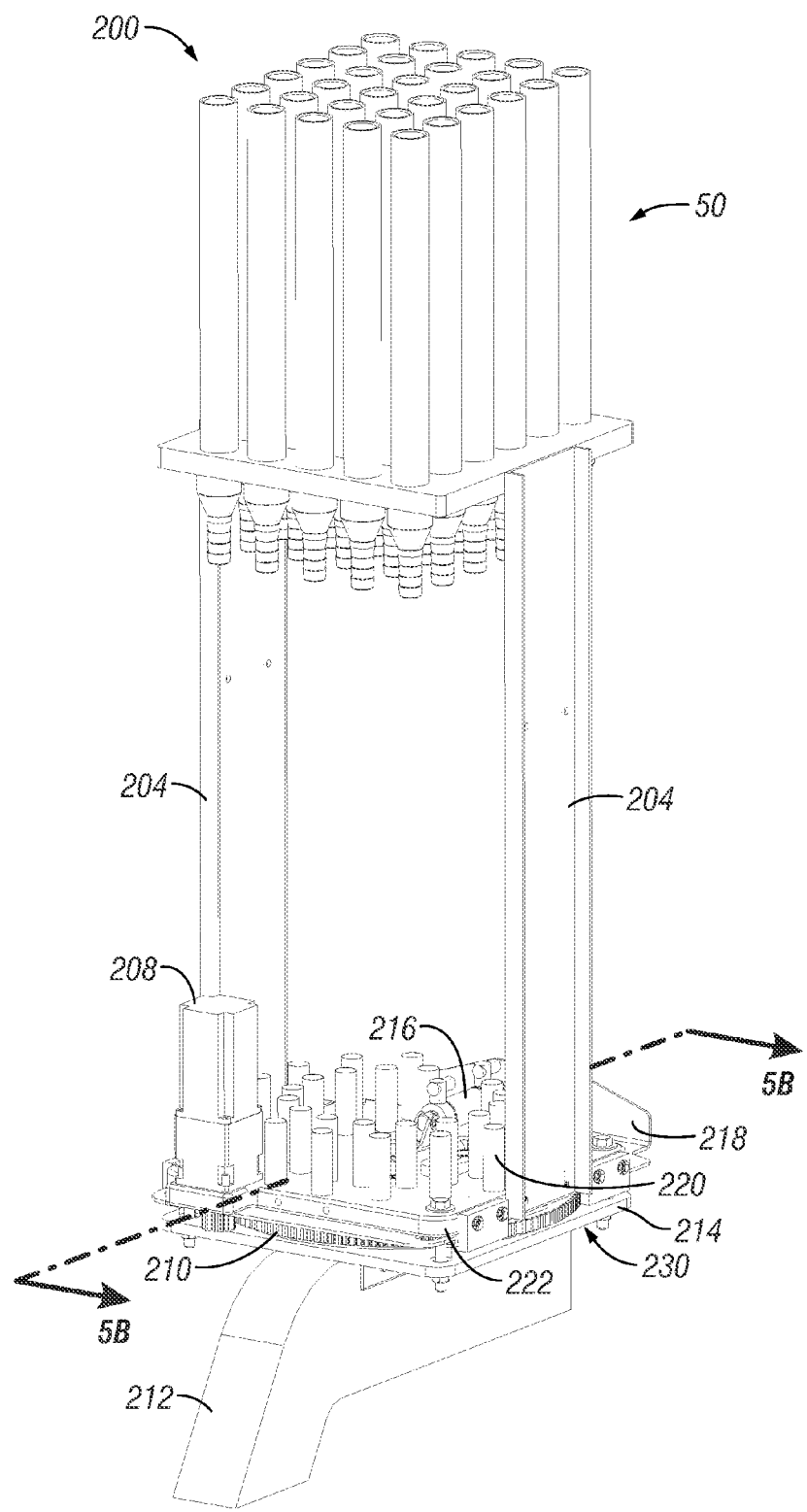
FIG. 5A is a perspective view of a seed metering unit according to an exemplary aspect of the present invention.
Figure 5B:
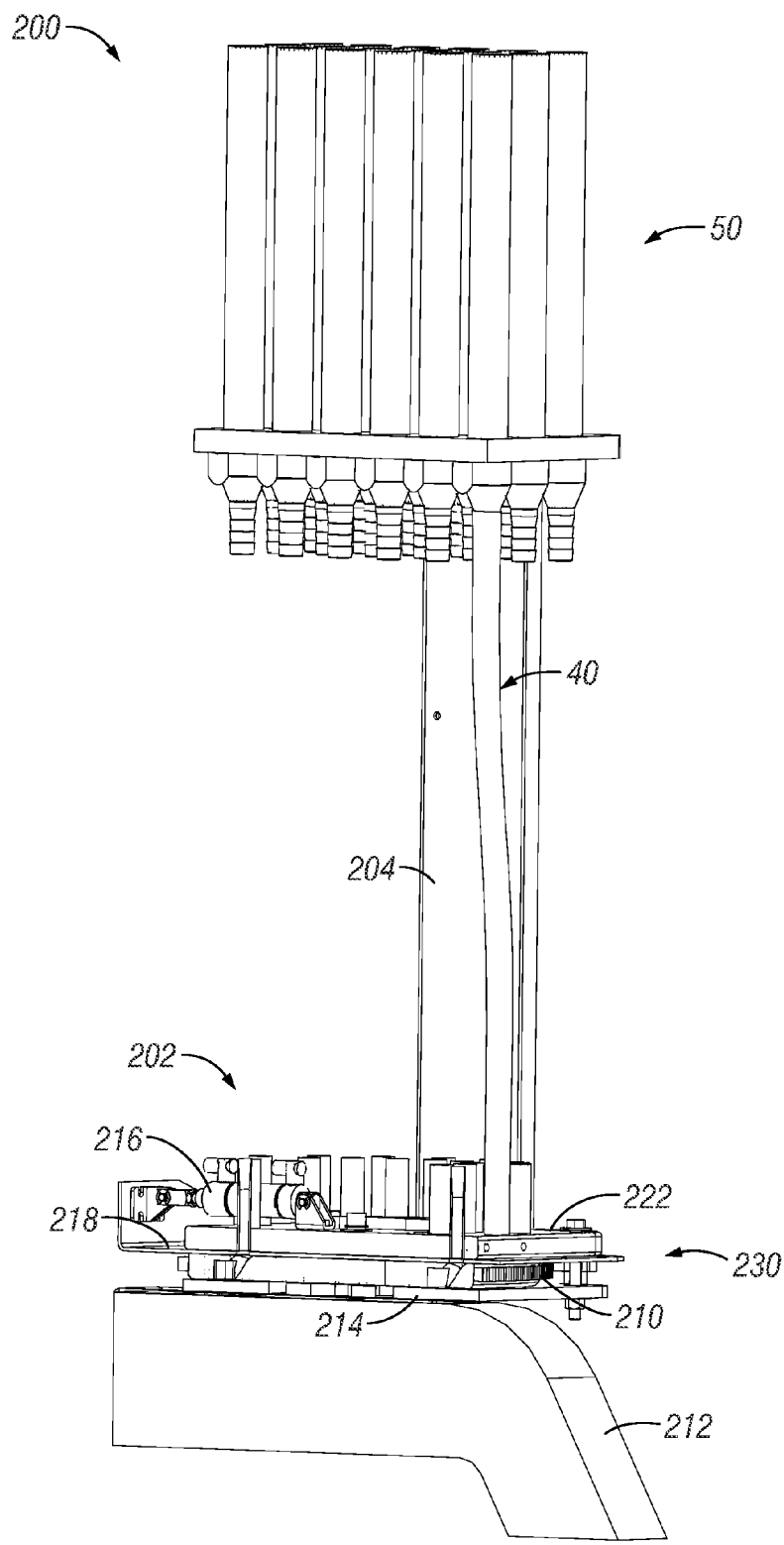
FIG. 5B is a sectional view of the seed metering unit taken along line 5B-5B in FIG. 5A.

A seed metering unit 200 according to an exemplary aspect of the present invention is shown in several exemplary views in FIGS. 5A-5H. The seed metering unit 200 has one or more staging assemblies 230 proximate planting unit 300 for staging batches of pre-singulated seed from one or more seed trays 118 to release one seed at a time from one batch of pre-singulated seed into the seed intake 302 for planting. One staging assembly in the seed metering unit 200 is a pre-staging assembly having a manifold 202 with a plurality of pre-staging apertures 220 to hold the batch of pre-singulated seed from one seed tray 118 proximate gate 218. A second staging assembly in the seed metering unit 200 includes a rotary seed plate 210 having a number of staging apertures 224 to hold a batch of pre-singulated seed from one seed tray proximate seed intake 302. Staging assemblies 230 assist in reducing conveyance times between dispenser 100 and planting unit 300, and provide predictability and timing of seed movement through the planter and into the ground. FIG. 5B is a sectional view of the seed metering unit 200 taken along line 5B-5B of FIG. 5A. As shown in FIGS. 5A and 5B, the seed metering unit 200 includes a manifold 202 having a manifold plate 222 and a plurality of pre-staging apertures 220 to hold dispensed seed proximate gate 218. As mentioned earlier, the pre-staging apertures 220 are in communication with the receptacle apertures 130 of the dispenser 200 through a plurality of conduit 40. Conduit 40 include a telescoping portion 50 to accommodate changes in distance between dispenser 100 and seed metering unit 200 due to contour changes in an area that is being planted. The telescoping portion 50 is attached to a lower portion of the seed metering unit by a pair of vertical braces 204. The design of the telescoping tubing portion 50 allows the conduit to remain substantially vertical and the pathway through the conduit to remain unobstructed as the planter encounters contour changes in a field. The telescoping tubing portion 50 in one aspect of the present invention includes undersized tubing received within oversized tubing. The undersized tubing slides in and out of the oversized tubing as the distance between the dispenser 100 and planting unit 200 changes with changes in contour in a field. In a preferred aspect of the present invention, the oversized tubing is rigid conduit and the undersized tubing is a flexible conduit.

FIG. 5B through a sectional view illustrates the relationship between the manifold 202, gate 218, rotary seed plate 210, and discharge plate 214. As shown in FIG. 3B, a dispensed seed enters manifold 202, and more specifically a pre-staging aperture 220, and is communicated to rotary seed plate 210 when gate 218 is in an open position and rotary seed plate 210 is in a home position. The gate 218 of the present embodiment is positioned between the manifold 202 and rotary seed plate 210. Gate 218 includes a plurality of apertures in corresponding pattern with plurality of pre-staging apertures 220 in manifold 202. Gate 218 is moveable between an open position and closed position by way of an actuator, which in a preferred embodiment is a slide gate cylinder 216. When gate 218 is an open position, the manifold pre-staging apertures 220 are in communication with staging apertures 224 in the rotary seed plate 210 and seed is allowed to move there-through. When gate 218 is not in an open position the seed is pre-staged such that it rests on gate 218 proximate rotary seed plate 210. In one aspect of the present invention, the actuation of slide gate cylinder 216 is triggered by the cable winder 400 which is setup according to the user defined alley spacing.

Figure 5C:
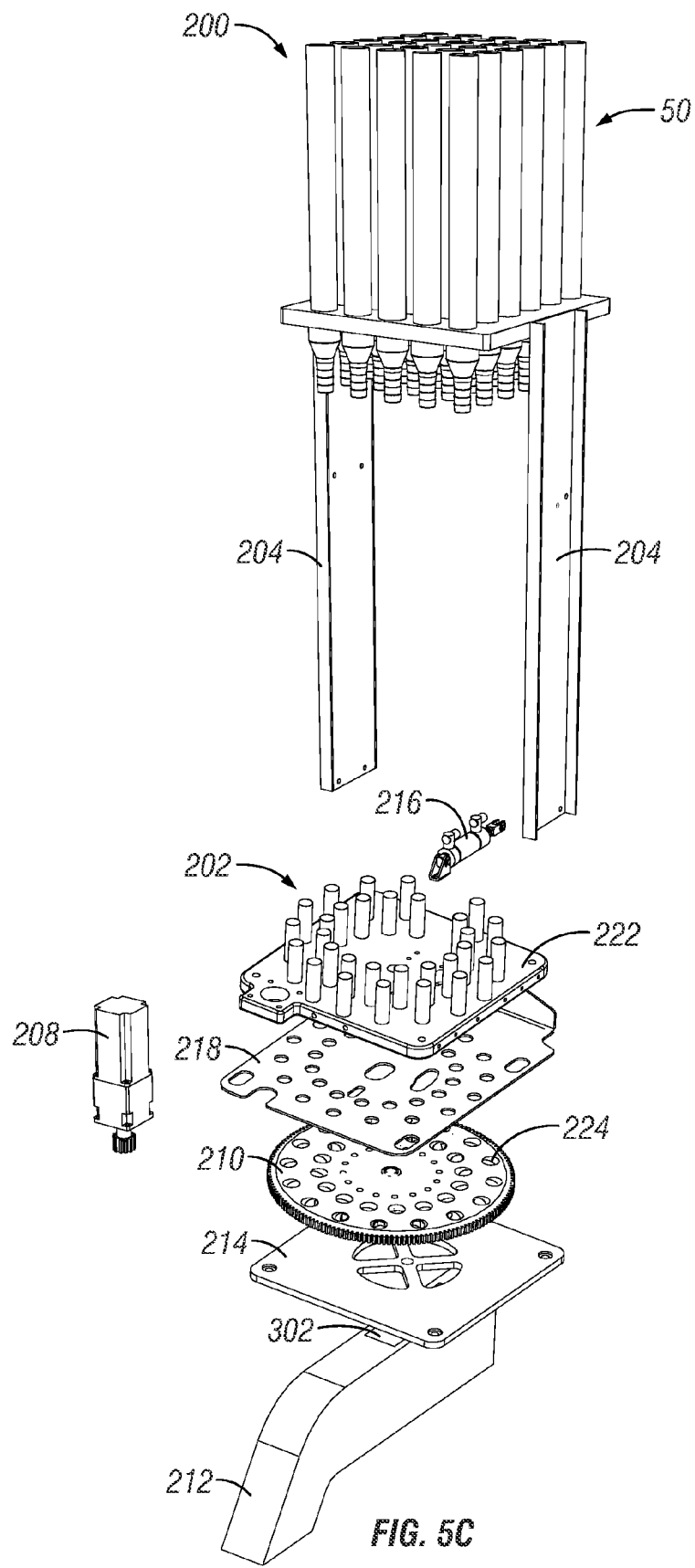
FIG. 5C is an exploded view of the seed metering unit shown in FIG. 5A.

Referring now to FIG. 5C, an exploded view of the seed metering unit 200 of the present invention is shown. As can be seen in this figure, gate 218 includes a plurality of apertures in corresponding pattern with plurality of pre-staging apertures 220 of manifold 202 and with staging apertures 224 of rotary seed plate 210 to communicate seed to rotary seed plate 210. Additionally, discharge plate 214 has a seed intake 226 for receiving seed from a staging aperture 224 on rotary seed plate 210 based on the desired planting interval determined by the user-defined seed spacing interval.

Figure 5D:
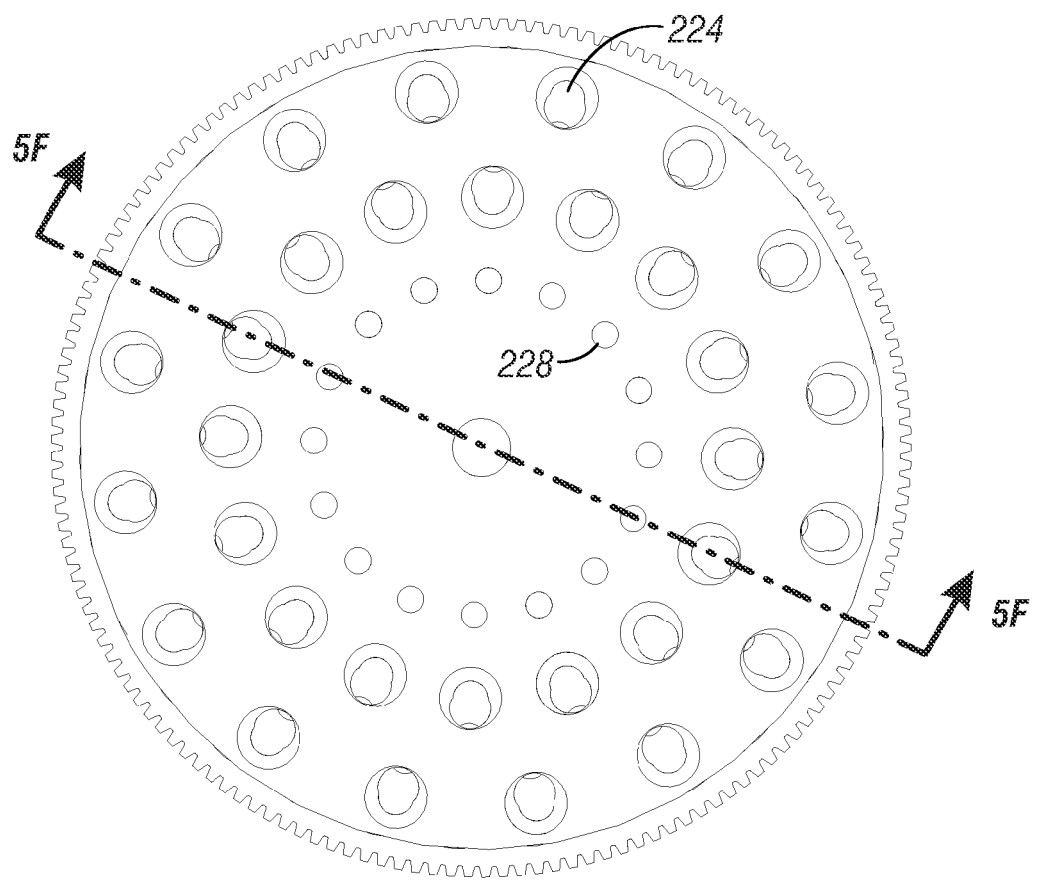
FIG. 5D is a plan view of the rotary seed plate shown in FIG. 5C.
Figure 5E:
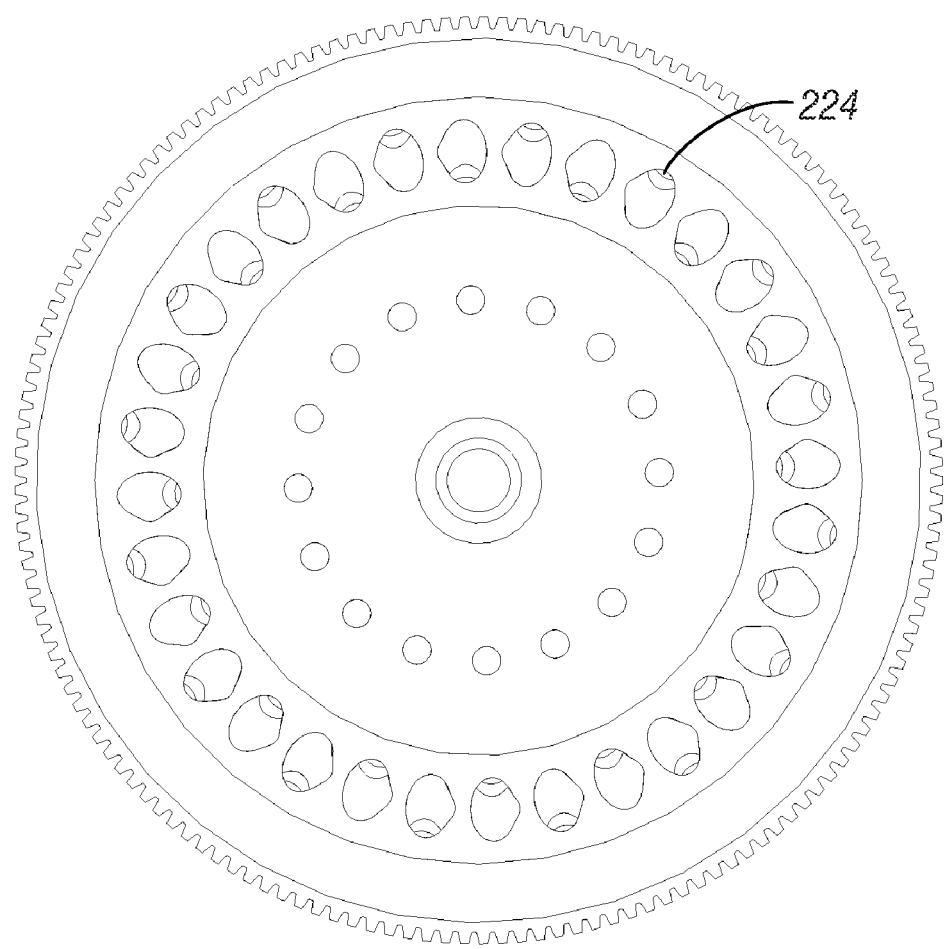
FIG. 5E is a bottom view of the rotary seed plate shown in FIG. 5D.
Figure 5F:
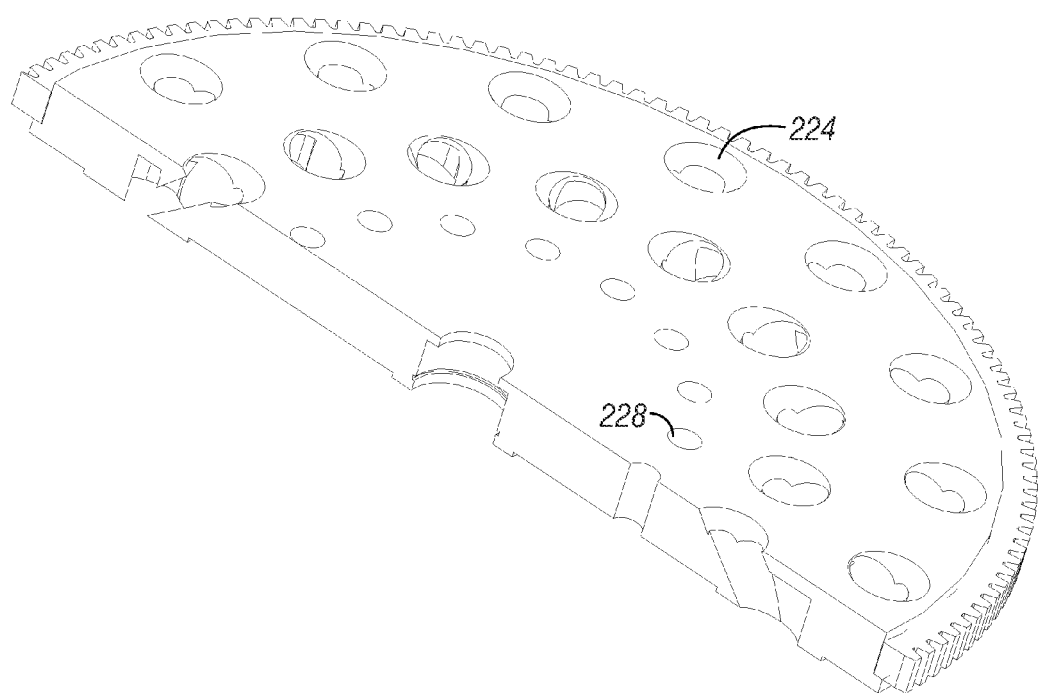
FIG. 5F is a sectional view of the rotary seed plate taken along line 5F-5F in FIG. 5D.

FIGS. 5D-F each illustrate exemplary embodiments of the rotary seed plate 210. A top view of rotary seed plate 210 is shown in FIG. 5D and discloses a plurality of staging apertures 224 and home positions 228. The home positions 228 correspond with staging apertures 224 in rotary seed plate 210 to assist in minimizing the rotation required to locate the next available staging aperture 224. In one exemplary aspect, when rotary seed plate 210 is empty and a home position is sensed, the rotation of rotary seed plate 210 is stopped and a new batch of seed may be loaded into staging apertures 224.

A stop in the rotation of the rotary seed plate 210 is not always necessary, but preferred. The present invention contemplates that the rotary seed plate 210 could be continuously rotated during the loading operation. For example, empty staging apertures 224 in the rotary seed plate 210 could be loaded simultaneously while others are being unloaded. In this manner the rotary seed plate 210 can be loaded by dispensed seed while maintaining the individual identity of each seed and ensuring that only one seed is planted at a time. FIG. 5E discloses a bottom view of rotary seed plate 210. In this view one can see that the plurality of apertures on the top side of rotary seed plate 210 have converged to a common radial reference point on the bottom side. In a preferred embodiment of this invention, the common radial reference point on the bottom side corresponds to or intersects with seed intake 226 in discharge plate 214 which corresponds with seed intake 302 in planting unit 300. It can be appreciated by one having ordinary skill in the art that the common radial reference point may vary depending on the seed intake system of a planting unit. FIG. 5F is a sectional view of rotary seed plate 210 taken along line 5F-5F in FIG. 5D. This figure illustrates the convergence of the plurality of apertures from the top side to a common radial reference on the bottom side. In this manner seeds can be released individually into the seed intake of any conventional planting unit so as to retain the identity of the seed and ensure that only a single seed is planted at each seed spacing interval.

Figure 5G:
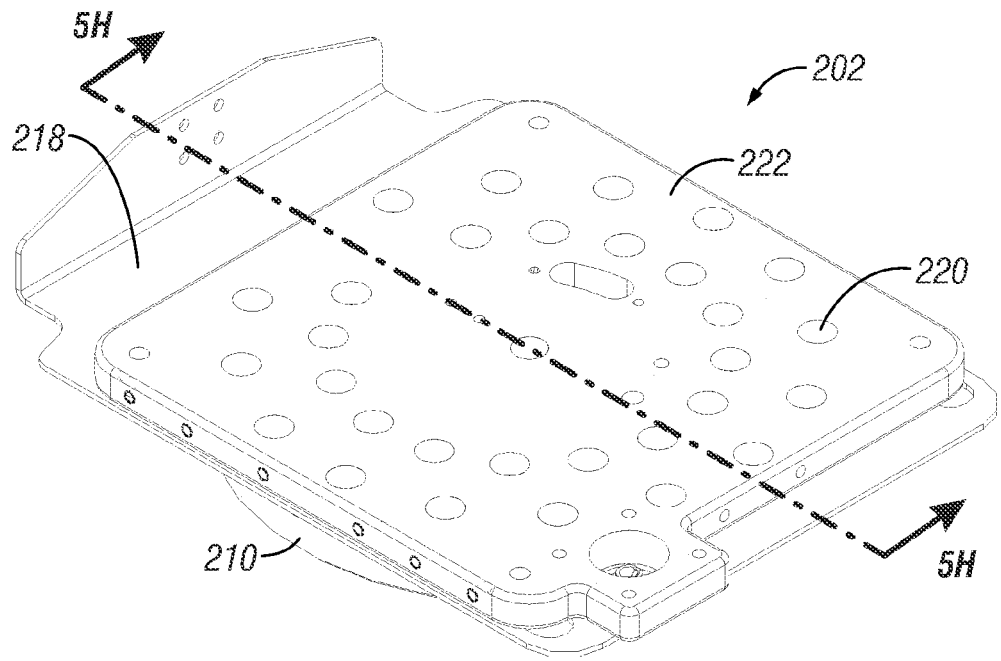
FIG. 5G is an isometric view of the manifold, gate and rotary seed plate of the seed metering unit shown in FIG. 5C.
Figure 5H:
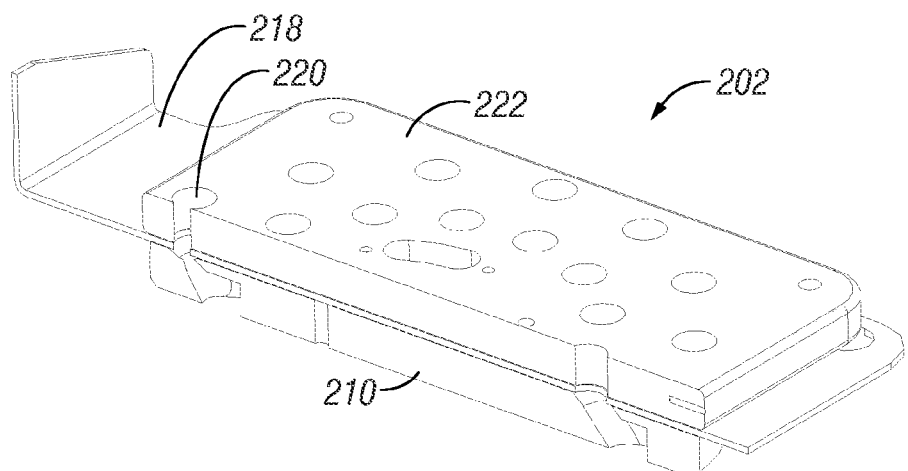
FIG. 5H is a sectional view taken along line 5H-5H in FIG. 5G.

Views of rotary seed plate 210, gate 218 and manifold plate 222 in isolation are shown in FIGS. 5G and 5H. FIG. 5G shows an isometric view of seed plate 210, gate 218 and manifold plate 220. FIG. 5H shows a sectional view of rotary seed plate 210, gate 218 and manifold plate 222 taken along line 5H-5H in FIG. 5G. As can be seen is this figure, when gate 218 is an open position, pre-staging apertures 220 of manifold plate 222 are in communication with staging apertures 224 of rotary seed plate 210. Such communication—i.e., when the gate is in an open position—allows seed to move from pre-staging apertures 222 into staging apertures 224 in rotary seed plate 210. FIG. 5H further illustrates how staging apertures 224 in rotary seed plate 210 converge from the top side to a common radial reference on the bottom side to correspond with seed intake 302 of planting unit 300 (as best shown in FIG. 5C). The seed metering unit 200 includes a mechanism, such as a servomotor 208, to rotate the rotary seed plate 210 at an RPM commensurate with a speed of the planter relative to ground and the desired seed planting density (e.g., seed spacing). Thus, when one of the staging apertures 224 is rotated overtop seed intake 226, the seed is communicated to planting unit 300 for planting. A cable winder 400 or spatial coordinate device triggers the rotation of the rotary seed plate 210. In this manner, pre-singulated seed are arranged in seed tray 118 commensurate with the desired position of seed in the pre-staging apertures 220 in manifold 202 and staging aperture 224 in rotary seed plate 210 to control planting location within a field or plot.

Figure 6A:
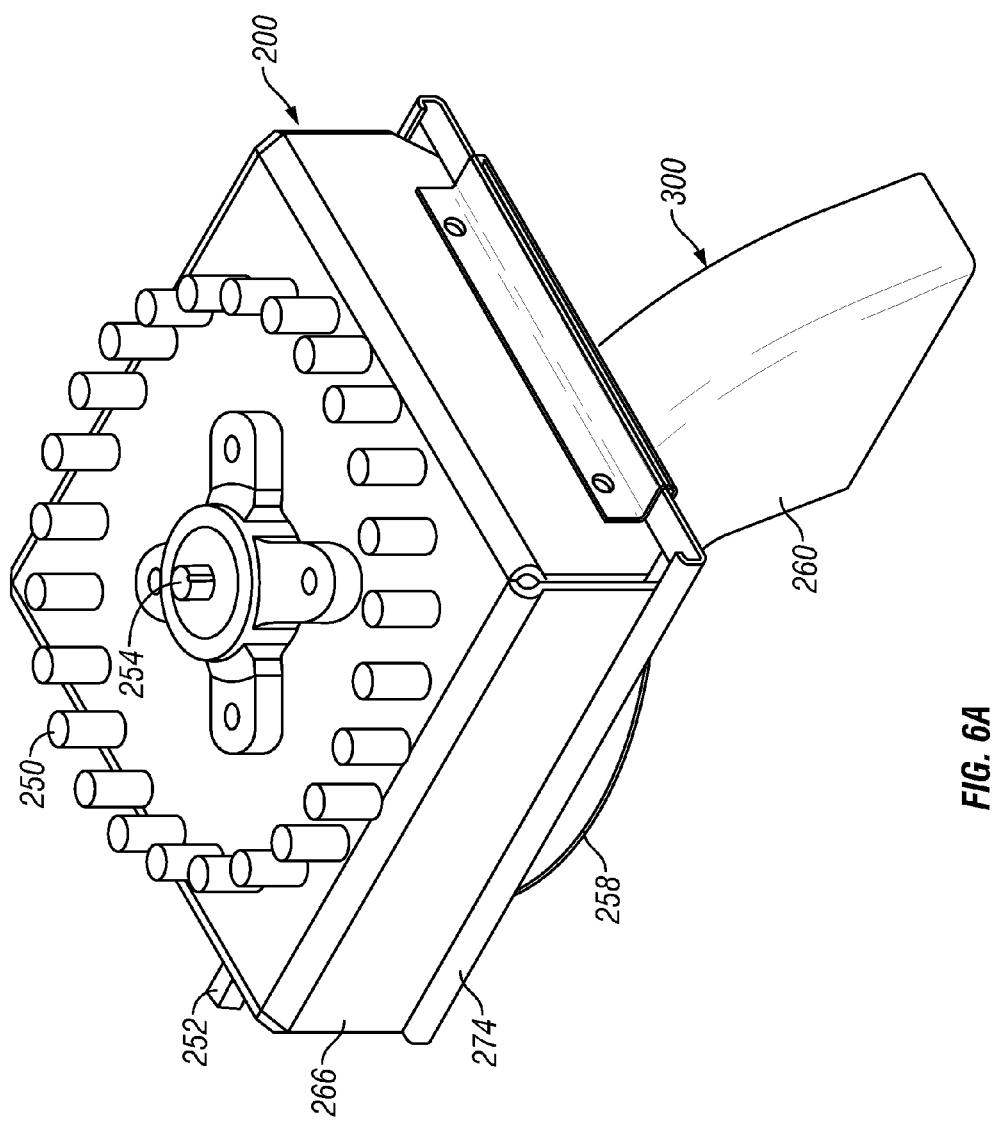
FIG. 6A is a perspective view of a seed metering unit according to another exemplary aspect of the present invention.
Figure 6B:
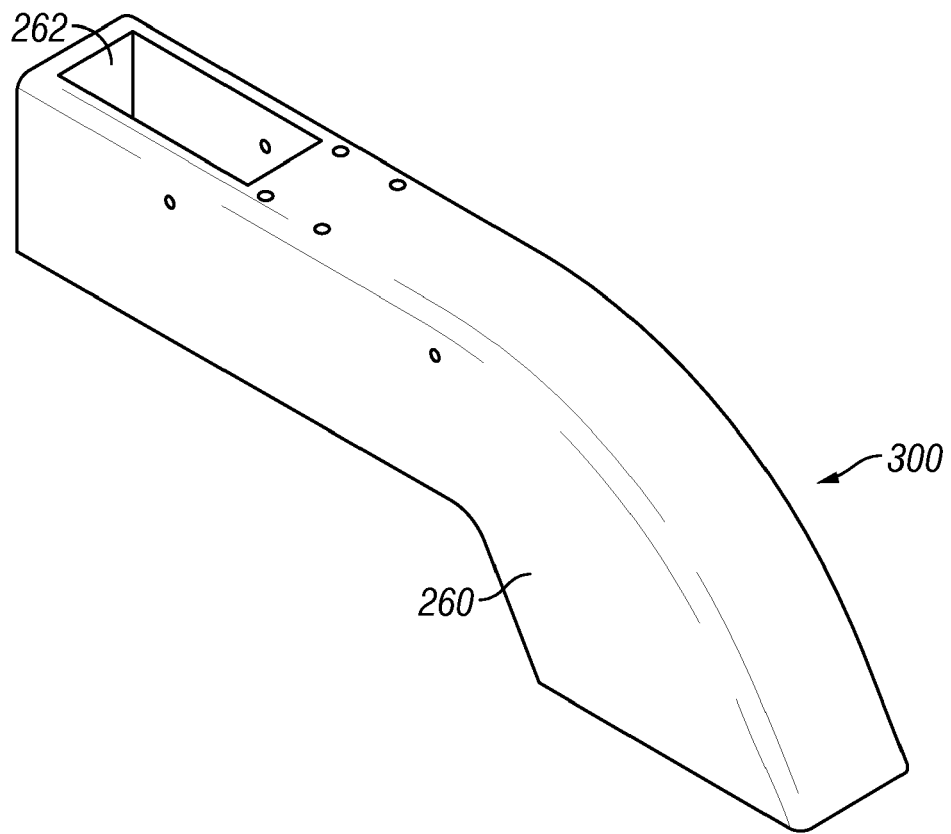
FIG. 6B is a perspective view of a planting arm of the planting unit according to an exemplary aspect of the present invention.
Figure 6C:
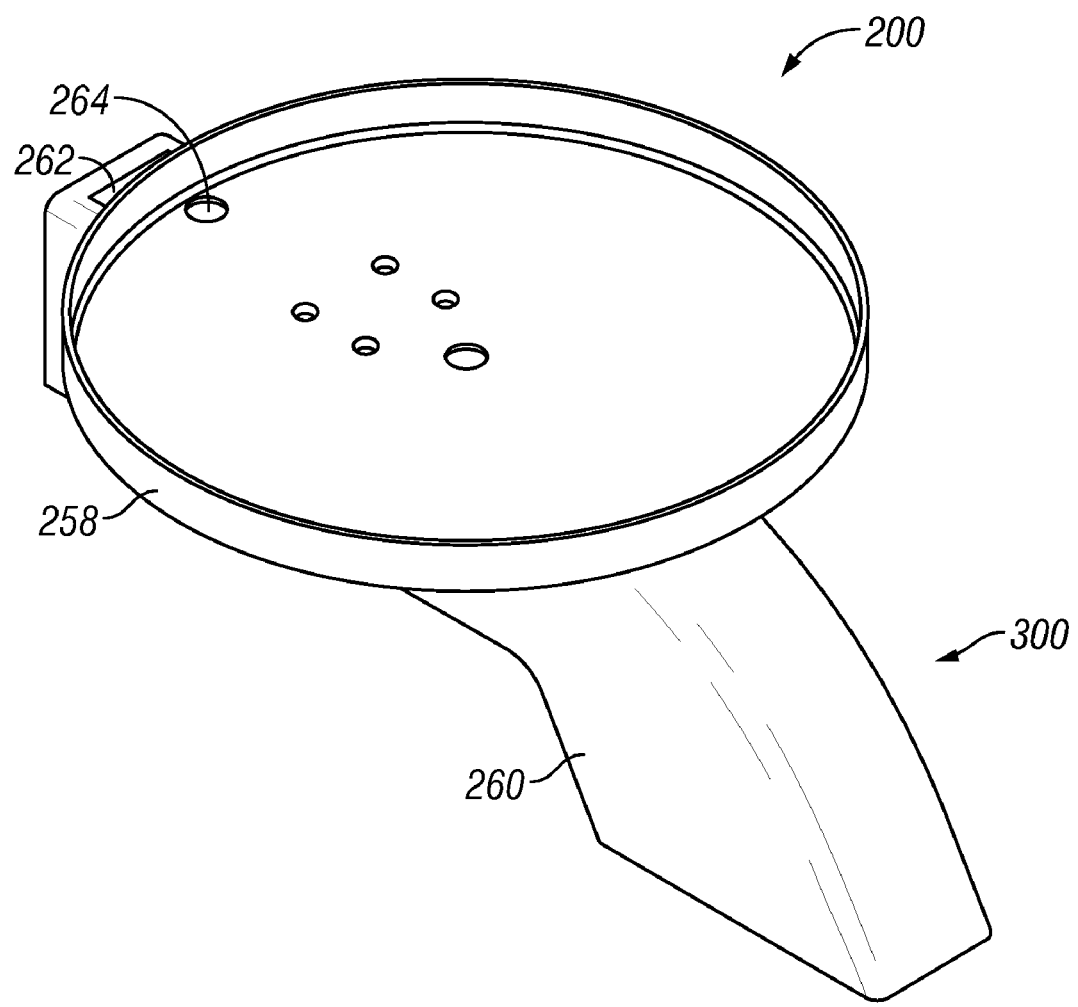
FIG. 6C is a perspective view of the planting arm shown in FIG. 6B with a mounting plate according to an exemplary aspect of the present invention.
Figure 6D:
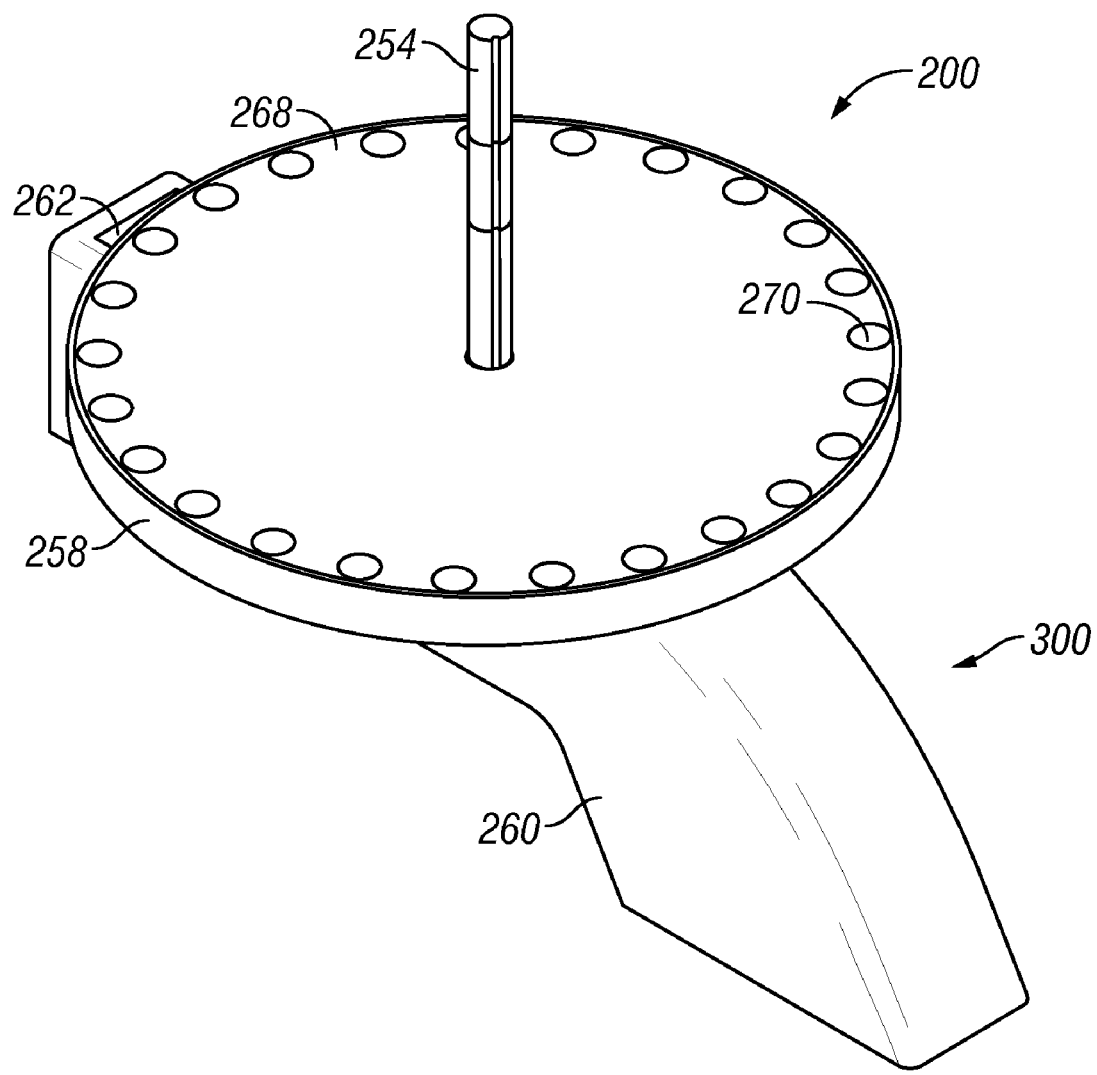
FIG. 6D is a perspective view the planting arm and mounting plate shown in FIG. 6C with a rotary seed plate and shaft according to an exemplary aspect of the present invention.
Figure 6E:
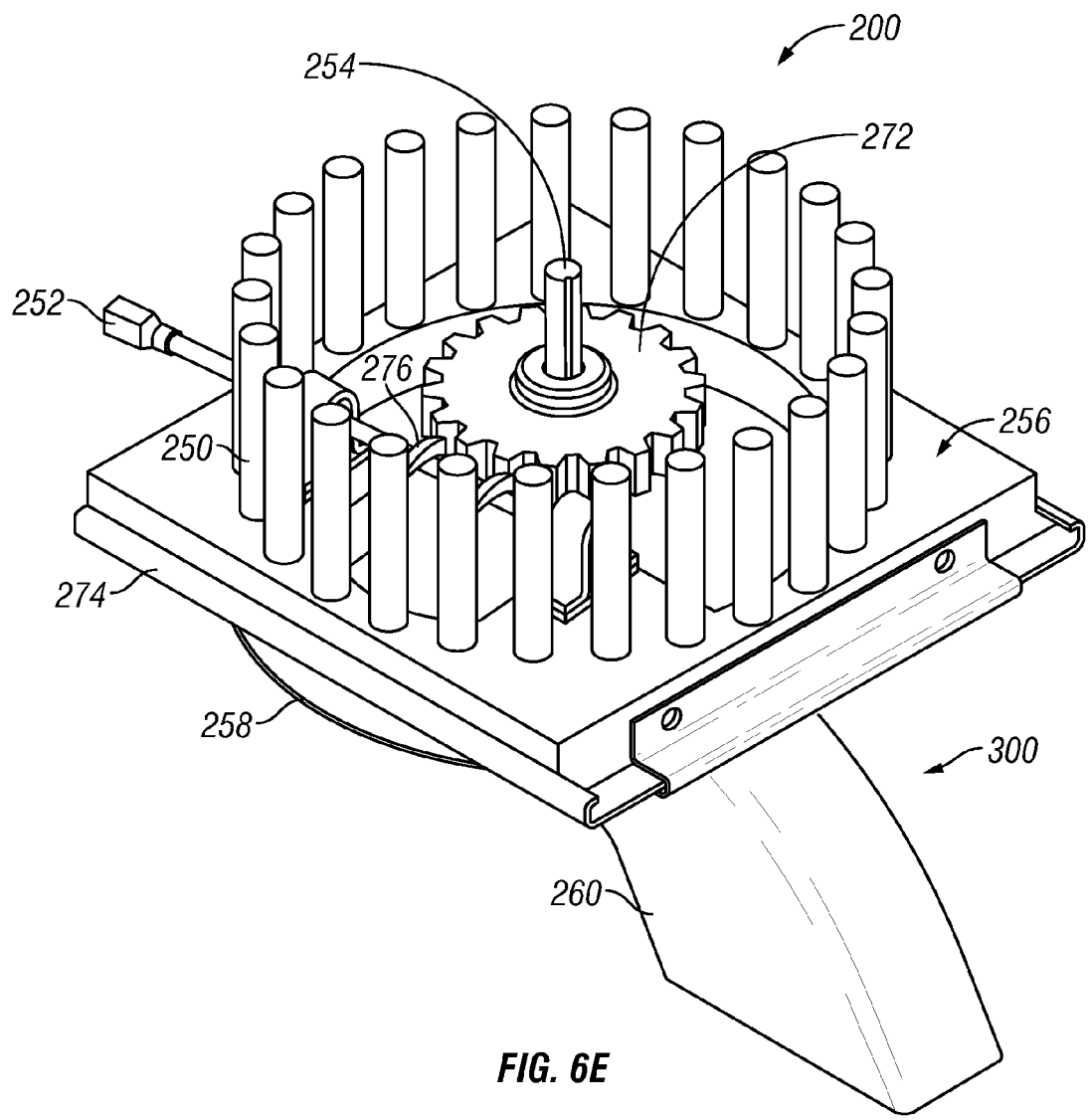
FIG. 6E is a perspective view of the planting arm, mounting plate, rotary seed plate and shaft shown in FIG. 6D with a seed manifold and drive shaft for driving a sprocket on the shaft according to an exemplary aspect of the present invention.

FIGS. 6A-E illustrate another seed metering unit 200 according to an exemplary aspect of the present invention. Seed metering unit 200 is attachable to a portion of planting unit 300, such as planting arm 260 (as best illustrated in FIG. 6B). As indicated earlier, planting arm 260 is of the type that is commercially available and includes a seed intake 262 adapted for receipt of a seed dispensed from seed metering unit 200. Seed metering unit 200 is attached to seed intake 262 by way of mounting plate 258 shown in FIG. 6E. Mounting plate 258 includes a seed dispensing aperture 264 in communication with seed intake 262 of planting arm 260. As best illustrated in FIG. 6B, seed metering unit 200 also includes a rotary seed plate 268 having staging apertures 270 spaced equal distance about the outer peripheral edge of rotary seed plate 268. Each staging aperture 270 in rotary seed plate 268 is positioned within rotary seed plate 268 so that staging aperture 270 is in communication with seed dispensing aperture 264 in mounting plate 258 and seed intake 262 in planting arm 260 when rotated to a point directly above both seed dispensing aperture 264 and seed intake 262. Thus, by gravity, seed within staging aperture 270 of rotary seed plate 268 release from rotary seed plate 268 and pass through seed dispensing aperture 264 and seed intake 262 for planting. Rotary seed plate 268 includes a shaft 254 attached at the center point of rotary seed plate 268 adapted to rotate rotary seed plate 268 to thereby move consecutive seed dispensing apertures 264 in communication with seed dispensing aperture 264 and seed intake 262 in planting arm 260. As best illustrated in FIG. 6E, seed metering unit 200 also includes a slide gate 274 positioned between rotary seed plate 268 and seed manifold 256. Seed manifold 256 includes a plurality of seed tubes 250 spaced radially about seed manifold 256 and in similar pattern to the plurality of staging apertures 270 in rotary seed plate 268. The plurality of seed tubes 250 passed through seed manifold 256 are in communication with the plurality of staging apertures 270 in rotary seed plate 268 when corresponding apertures (apertures corresponding to plurality of seed tubes 250 and plurality of staging apertures 270) are brought into communication with each other by moving the plurality of apertures (not shown) in slide gate 274 into communication with plurality of seed tubes 250 and plurality of staging apertures 270. A sprocket 272 is attached to shaft 254 and driven by a worm gear 276 attached to drive shaft 252. Thus, rotation of drive shaft 252 causes rotation of sprocket 272 and hence rotation of rotary seed plate 268.

Figure 7A:
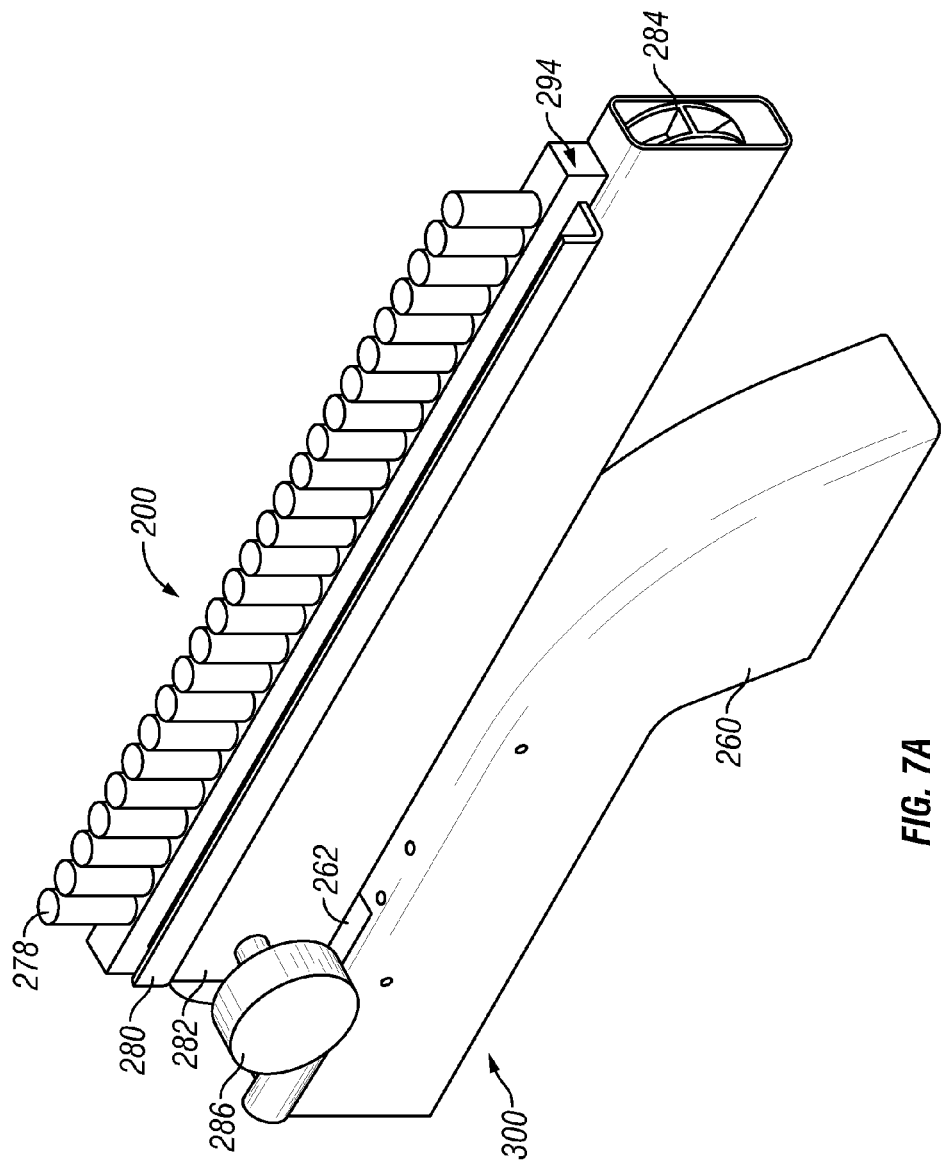
FIG. 7A is a perspective view of a seed metering unit according to another exemplary aspect of the present invention.
Figure 7B:
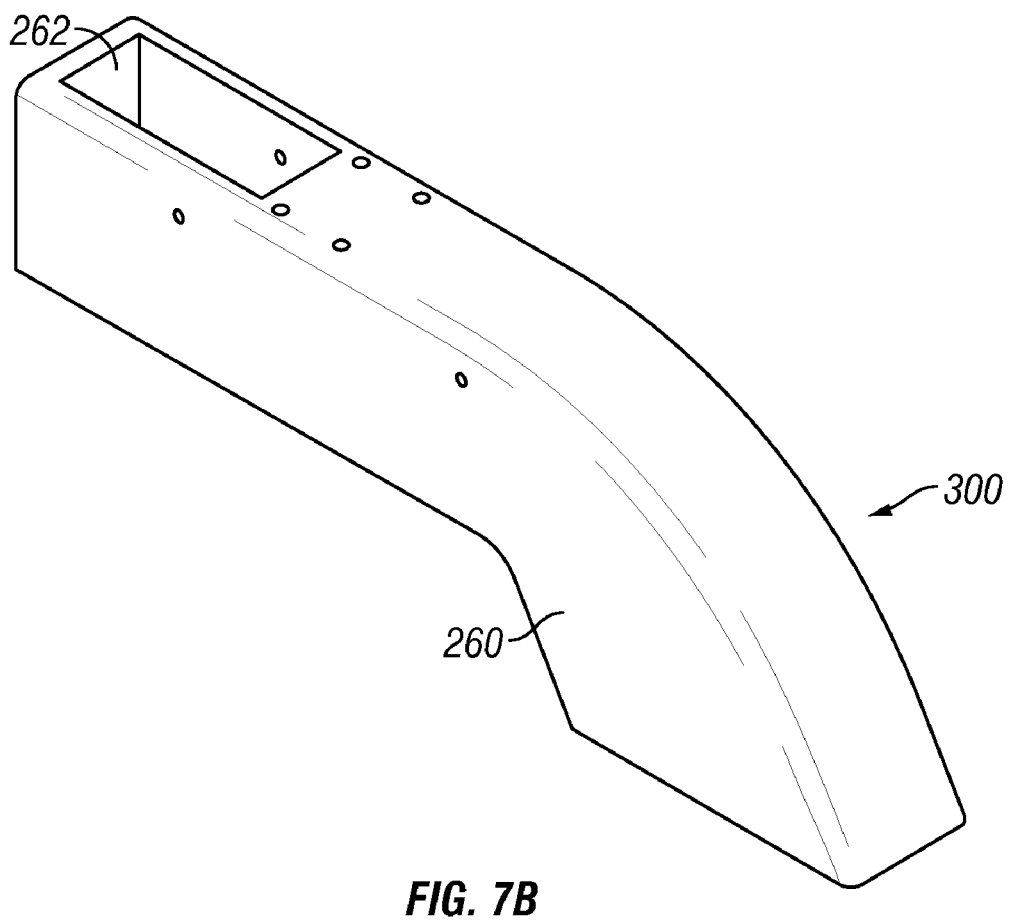
FIG. 7B is a perspective view of a planting arm of the planting unit according to an exemplary aspect of the present invention.
Figure 7C:
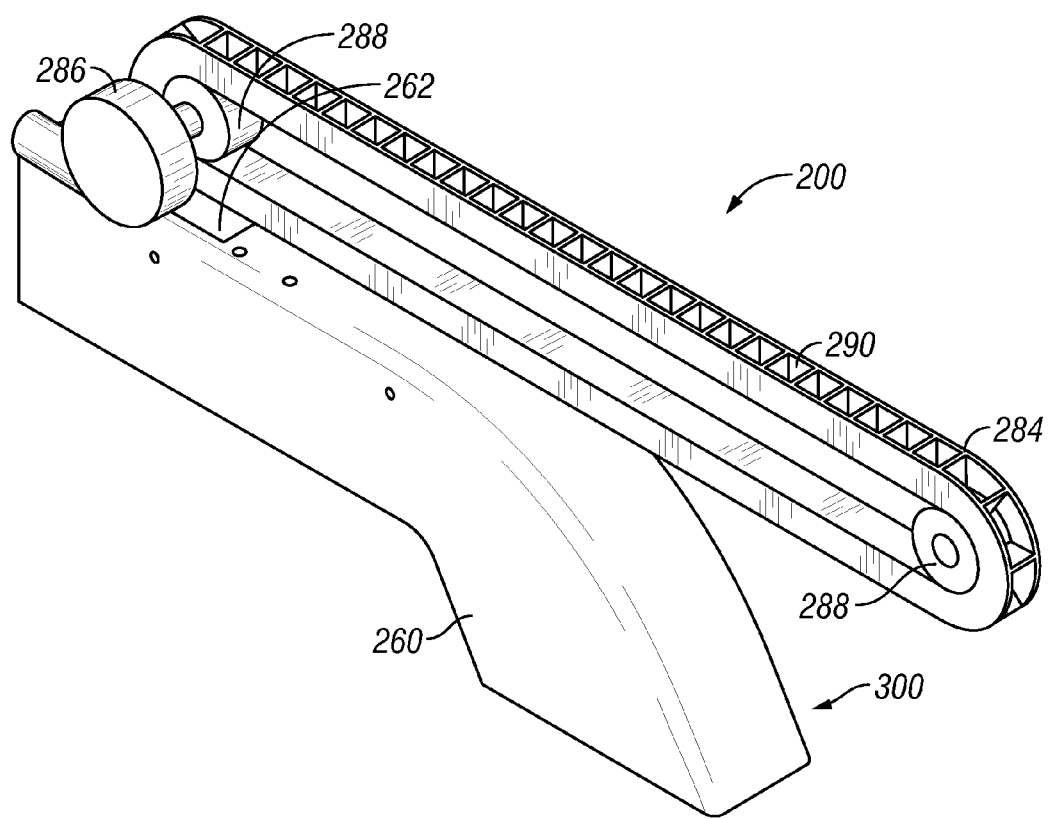
FIG. 7C is a perspective view of the planting arm shown in FIG. 7B with a rotary seed chain of the seed metering unit according to an exemplary aspect of the present invention.
Figure 7D:
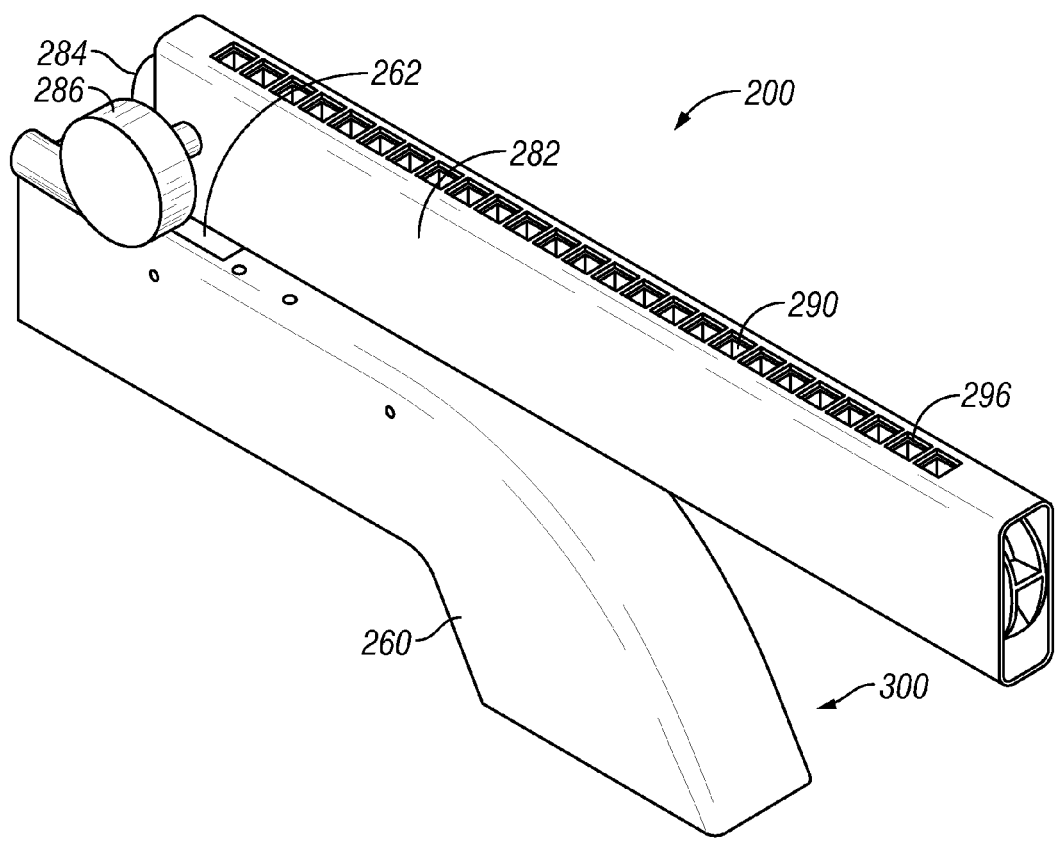
FIG. 7D is a perspective view of the planting arm and rotary seed chain shown in FIG. 7C within a housing according to an exemplary aspect of the present invention.
Figure 7E:
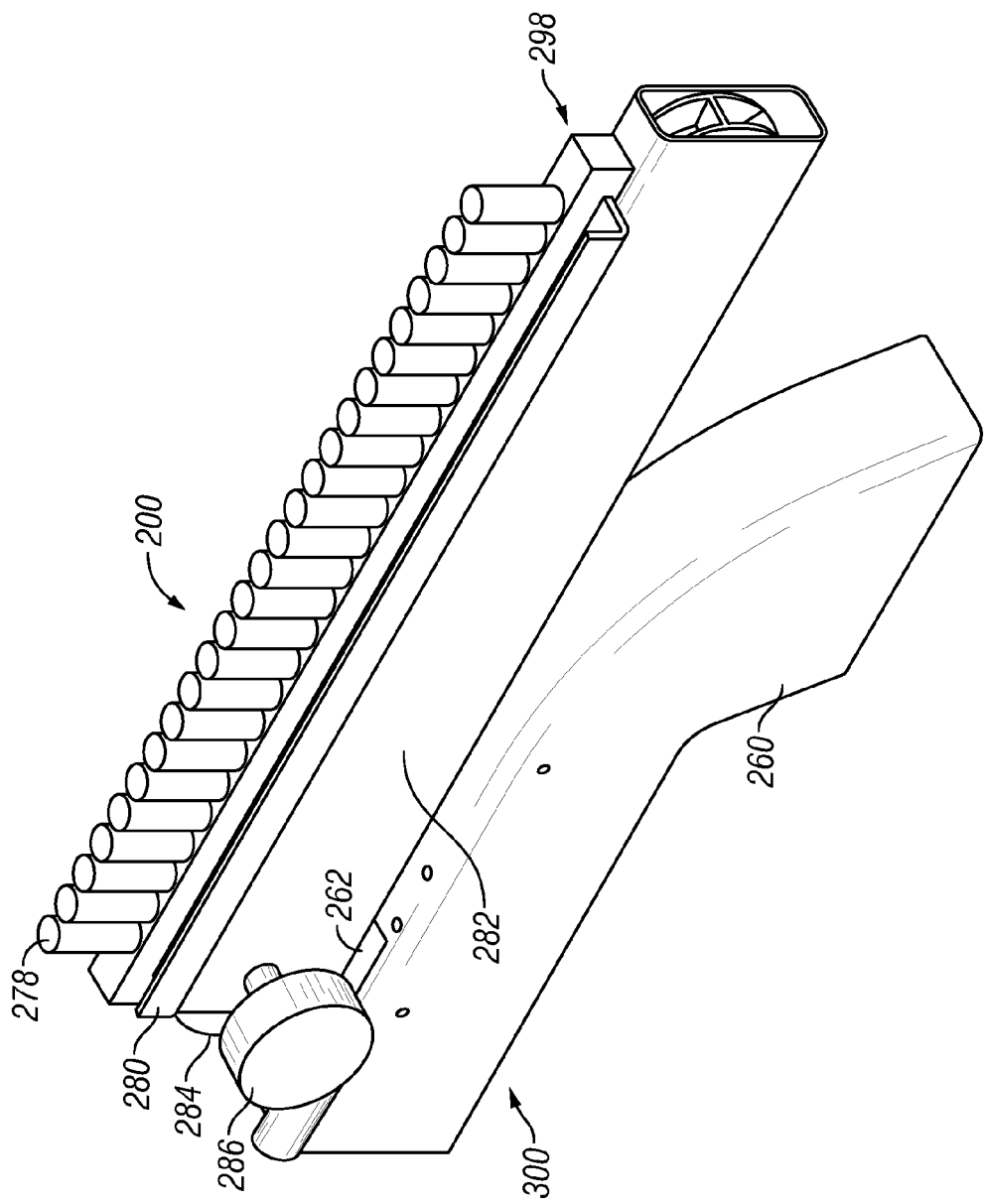
FIG. 7E is a perspective view of the planting arm, rotary seed chain and housing shown in FIG. 7E with seed tubes and a slide gate according to an exemplary aspect of the present invention.

FIGS. 7A-E illustrate another seed metering unit 200 according to an exemplary aspect of the present invention. Like seed metering unit 200 illustrated in FIGS. 6A-E, seed metering unit 200 illustrated in FIGS. 7A-E is configured to attach to planting arm 260 of planting unit 300. Seed metering unit 200 includes a rotary seed chain 284 having a plurality of staging apertures 290 rotatably supported by a pair of gears 288. A drive 286 is attached to one or both of the gears 288 (as best illustrated in FIG. 7C) for rotating rotary seed chain 284. Rotation of rotary seed chain 284 moves consecutive staging apertures 290 in rotary seed chain 284 directly over top seed intake 262 in planting arm 260. Seed within each staging aperture 290, upon rotation over top of seed intake 262 in planting arm 260, moves by gravity into seed intake 262. Rotary seed chain 284 is enclosed by a housing 282 having a plurality of apertures 296 spaced in corresponding pattern to the plurality of staging apertures 290 in rotary seed belt 292 as best illustrated in FIG. 7D. Seed metering unit 200 also includes a seed manifold 298 having a plurality of seed tubes 278 vertically disposed thereon. Seed manifold 298 also includes slide gate 280 configured to move in and out of seed manifold 298. When slide gate 280 is in the out position, the plurality of seed tubes 278 are in communication with a plurality of apertures 296 in housing 282 and the plurality of staging apertures 290 in rotary seed chain 284. Thus, by gravity, seed received within the plurality of seed tubes 278 is moved through the plurality of seed tubes 278 into the plurality of staging apertures 290 in rotary seed chain 284 upon movement of slide gate 280 out of seed manifold 298 (slide gate 280 no longer interferes with the travel path of seed through seed tube 278 into staging aperture 290 in rotary seed chain 284).

FIGS. 8A-D illustrate another seed metering unit 200 according to an exemplary aspect of the present invention.

Figure 8A:
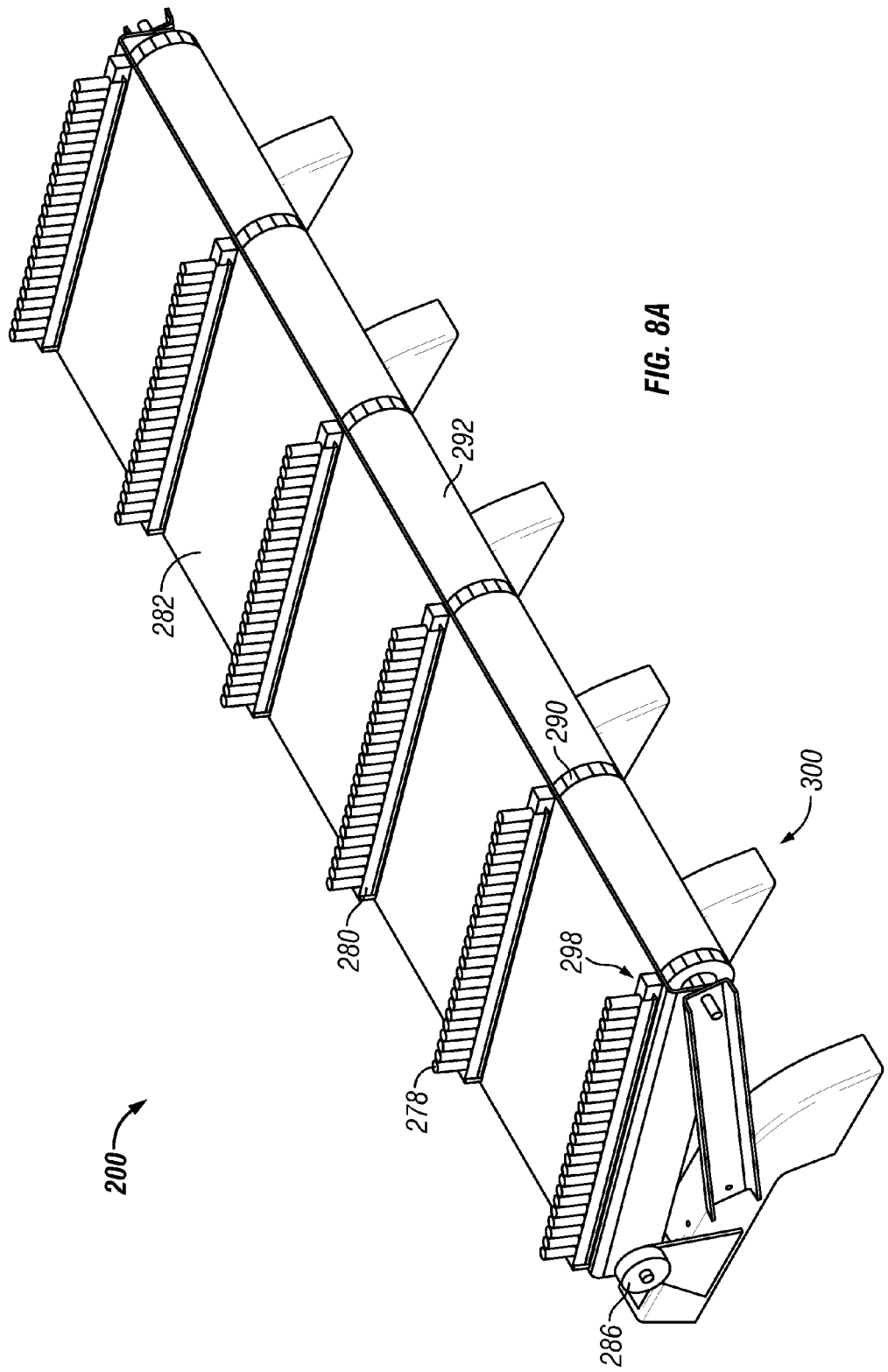
FIG. 8A is a perspective view of a seed metering unit according to another exemplary embodiment of the present invention.
Figure 8B:
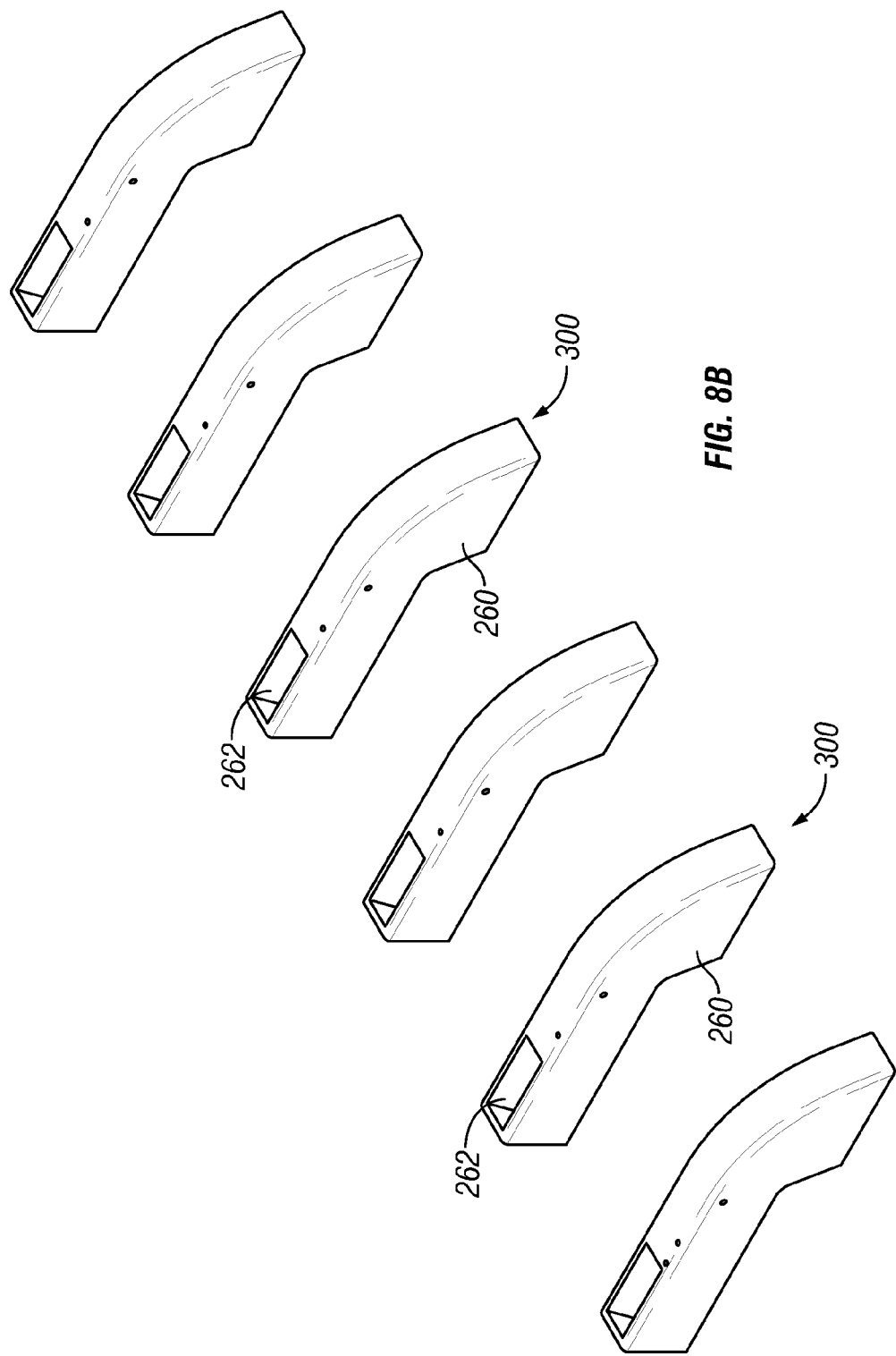
FIG. 8B is a perspective view of a planting arm of the planting unit according to an exemplary aspect of the present invention.
Figure 8C:
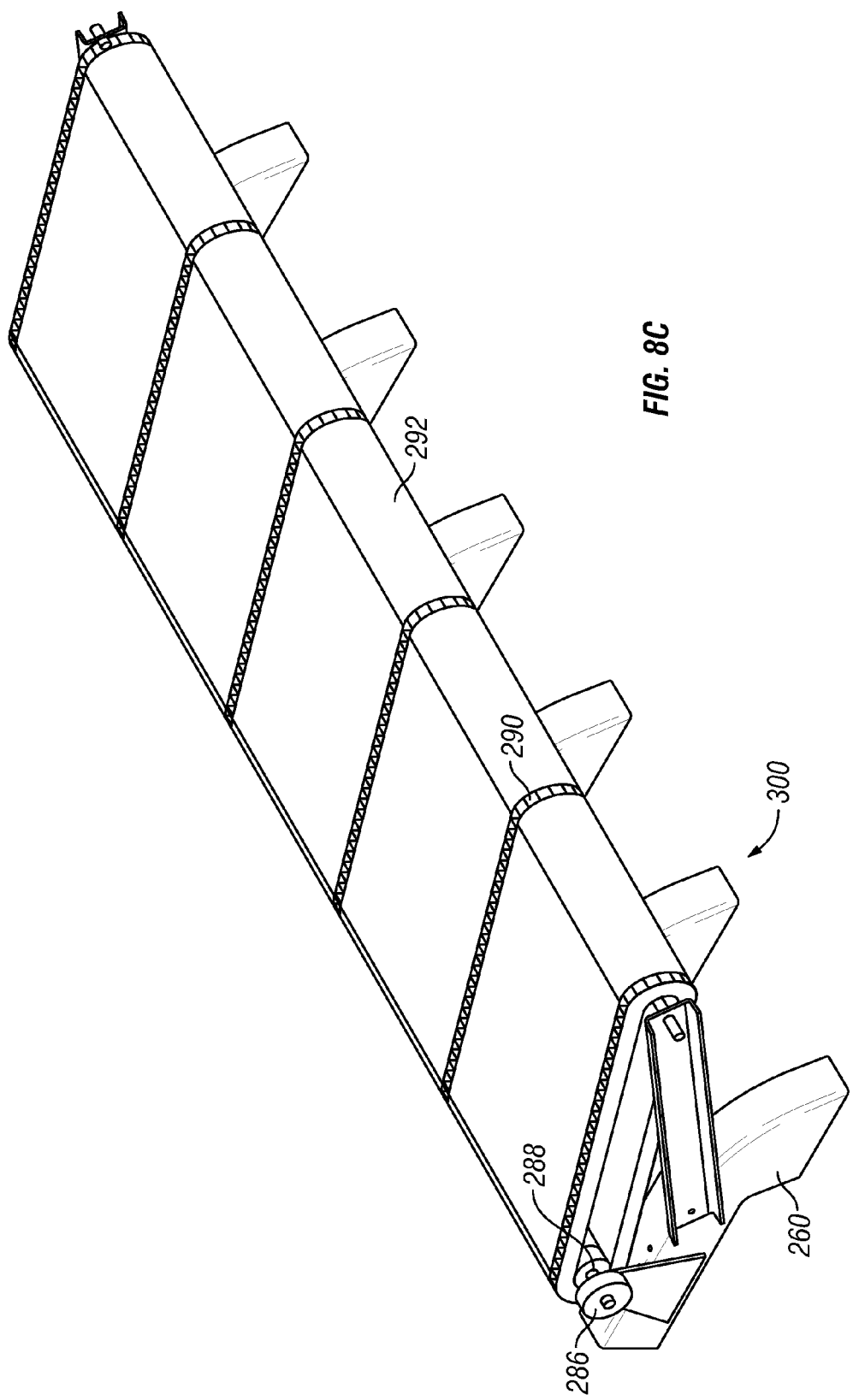
FIG. 8C is a perspective view of the planting arm shown in FIG. 8B with a rotary seed belt of the seed metering unit according to an exemplary aspect of the present invention.
Figure 8D:
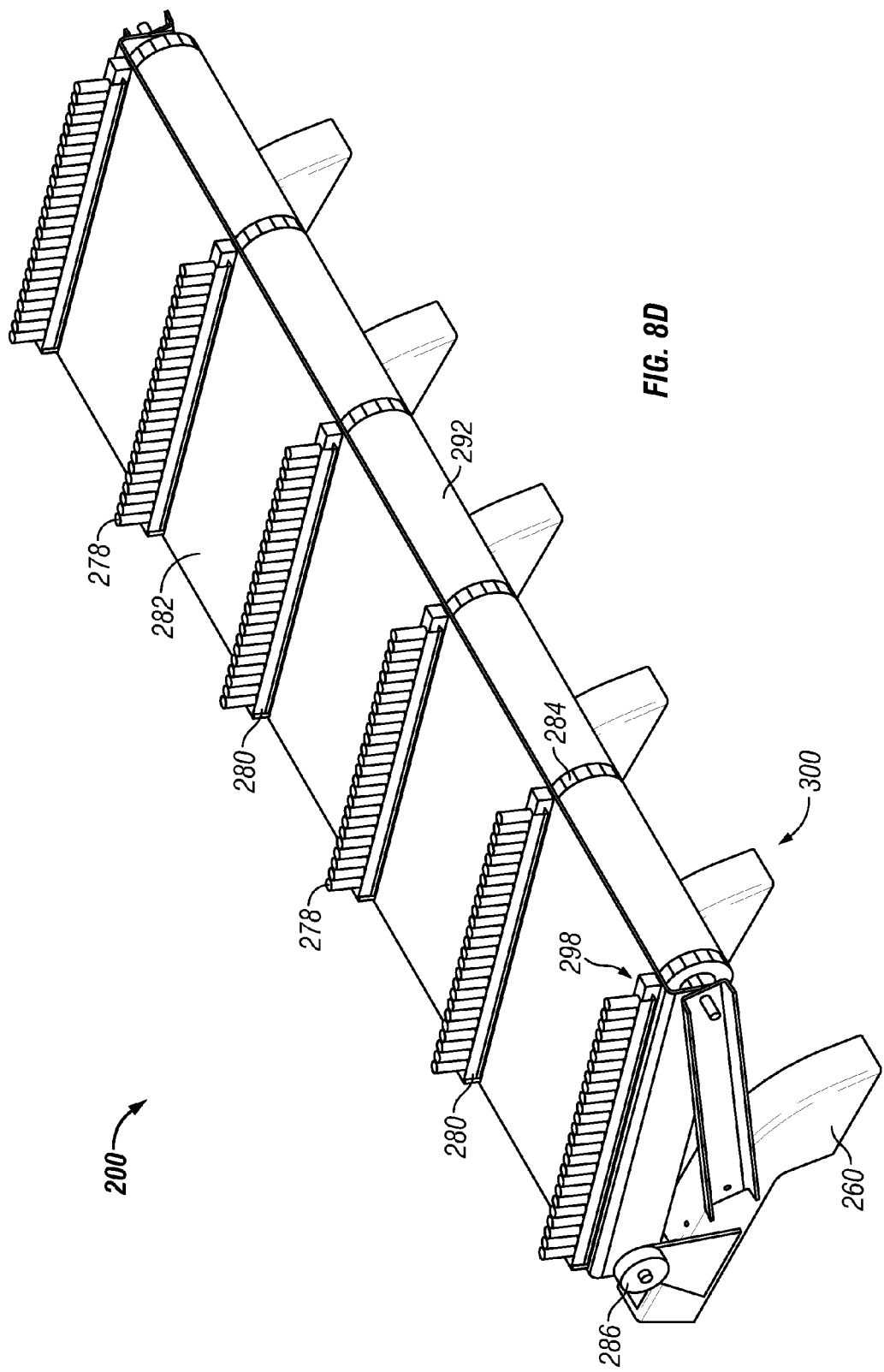
FIG. 8D is a perspective view of the planting arm and rotary seed belt shown in FIG. 8C with seed tubes and a slide gate according to an exemplary aspect of the present invention.
Figure 10A:
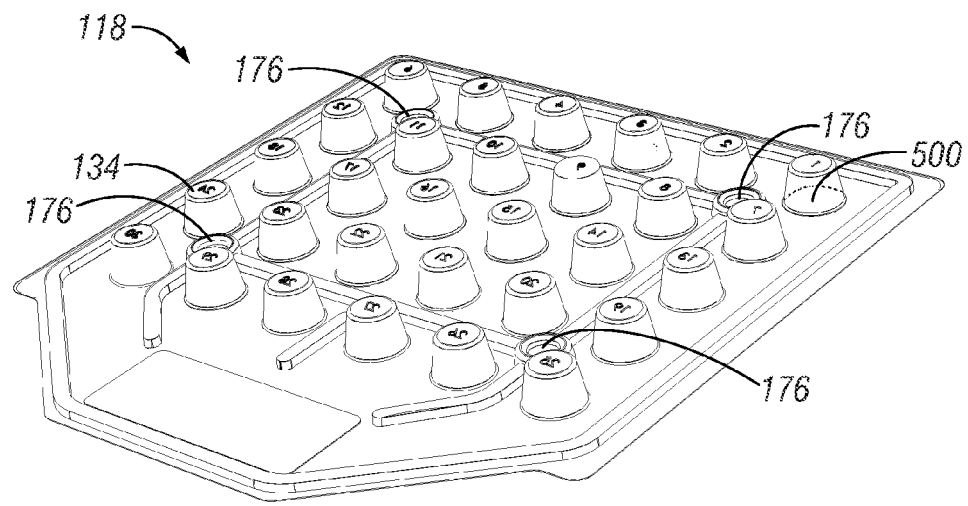
FIG. 10A is a perspective view of a seed carrier according to another exemplary aspect of the present invention.

Like seed metering unit 200 illustrated in FIGS. 7A-E, seed metering unit 200 illustrated in FIGS. 8A-D is configured to attach to planting arm(s) 260 of planting unit 300. Seed metering unit 200, as best illustrated in FIG. 8C, includes a rotary seed belt 292 having a plurality of staging apertures 290 arranged in similar fashion to rotary seed chain 284 illustrated in FIG. 7C. For example, rotary seed belt 292 may include 1, 2, or several rotary seed chain-like configurations having a plurality of staging apertures 290 for staging seed proximate planting unit 300. As best illustrated in FIG. 8D, seed metering unit 200 also includes a housing 282 in covering relation to rotary seed belt 292. Seed manifolds 298 having a plurality of seed tubes 278 attached to housing 282 directly above the rotary seed chain configuration having the plurality of staging apertures 290 in rotary seed belt 292. A slide gate 280 is provided and interrupts communication between the plurality of seed tubes 278 in seed manifold 298 and plurality of staging apertures 290 in rotary seed belt 292. When slide gate 280 is in the open position, seed tubes 278 are in communication with staging apertures 290 in rotary seed belt 292. Conversely, when slide gate 280 is in the closed position, communication between seed tube 278 and staging apertures 290 in rotary seed belt 292 is blocked. Different embodiments of seed tray 118 are displayed in FIGS. 9A, 9B, 10A, and 10B. FIG. 9A shows a top view of a 150 well seed tray for use in combination with dispenser 100 shown in FIG. 2A. Those skilled in the art can appreciate that seed tray 118 can be configured with any number of wells 134, as exemplified in FIGS. 4A-B and 10A-B. Seeds are disposed within the seed tray 118 within a well 134. Seed tray 118 is placed in receptacle 116 of the dispenser 100 with the top side facing generally upward. FIG. 9B shows a bottom view of seed tray 118. FIG. 10A shows the top side of a 30 well seed tray for use in combination with dispenser 100 shown in FIG. 2F. In an exemplary embodiment, seed tray 118 is a blister pack type having a plurality of wells. In operation, press 104 of dispenser 100 deblisters or ruptures the well 134 such that the seed is forced in a generally downward direction through the receptacle apertures 130. FIGS. 4A-B, 9A-B and 10A-B illustrates alternative examples of seed tray 118. Seed tray 118 has a base sheet or substrate with multiple holes from which plastic bubble-shaped clear plastic containers extend. Further detail can be found at U.S. patent application Ser. No. 12/235,100, filed Sep. 22, 2008, which is incorporated by reference herein. The batch of pre-singulated seed can be arranged within the seed tray 118 commensurate with the desired position of seed in the pre-staging apertures 220 in the manifold 202 and staging ports 224 in the rotary seed plate 210 to control planting location within a field or plot. It can be appreciated by one of ordinary skill in the art that the seed can be further pre-configured within the seed tray 118 for planting to facilitate characterization of the resulting plant. It can further be appreciated that seed tray 118 need not be full to operate according to the different embodiments of the invention. The seed tray 118 in some instances may contain any number of seeds according to the desired planting sequence determined by the user. The present invention contemplates that batches of seed may be singulated by placing a seed in each well of seed tray 118. Alternatively, each well of seed tray 118 may have a pre-specified count of seed (seed count≧1 seed) separated from other counts in the batch. The seed planter maintains separation of the pre-specified counts of seed from other counts in the batch.

Thus, the seeds may be pre-singulated such that empty wells are present and the identity of the seeds will be maintained to provide a map of the plantings. FIGS. 4A and 4B show an alternative embodiment of seed tray 118. In this embodiment, plurality of wells 134 in seed tray 118 are covered by a thin slide plate (not shown). The thin slide plate is removed from a covering relation position when seed tray is loaded into dispenser 100 shown in FIG. 4A-B. After the thin slide is removed, seed within wells 134 are retained within wells 134 by cover plate 172 in dispenser 100. Moving wells 134 in seed tray 118 into communication with apertures 166 in manifold 164 allows seed to be dispensed from wells 134 in seed tray 118. Thus, the seed would be sequentially dispensed from the plurality of exposed wells 134 into the seed metering unit.

Method

In operation, and as seen in FIG. 1, a user is able to place seed housed in singulation in seed tray 118 into the dispenser 100 while standing on the loading platform 30. A user interface 14 allows the user to monitor, change and/or override the operation of the seed planter. After the seed is dispensed, the seed travels in singulation from the dispenser 100 to seed metering unit 200 through a plurality of conduit 40. The plurality of conduit 40 in the present embodiment is flexible hose. The conduits are oriented between the dispenser 100 and the seed metering unit 200 commensurate to an angle of repose to allow the pre-singulated seed to travel at a controlled speed after it is dispensed. Between the dispenser 100 and the seed metering unit 200, a telescoping portion 50 allows the conduit to remain substantially vertical and allows the pathway through the conduit to remain unobstructed as the planter encounters contour changes in a field. After the seed has traveled to the seed metering unit 200, the seed is staged in one or more staging assemblies 230 proximate a conventional planting unit 300. In one aspect of the present invention, slide gate 218 is opened when triggered by a conventional cable winder 400, such as for example by buttons on the cable. Rotary seed plate 210 is rotated at a rate commensurate with pulses from an encoder that senses rotation of a pulley in cable winder 400 as shown and described in U.S. Pat. No. 7,337,733. Thus, individual seed is released into seed intake 302 for planting when rotary seed plate 210 is rotated at a rate commensurate with pulses received from the encoder. Those skilled in the art can appreciate that encoder need not be cable driven, but could be a ground driven encoder. The control over velocity of the rotary seed plate 210 could also be accomplished by a digital signal received from a global positioning system (GPS), ground speed radar, or other like indicators (i.e., any system capable of providing information or deducting from acquired information a control over velocity functionality using change in position of the planter unit and the time element associated with the position change). The cable winder may be configured by the user to have specific intervals of cable to control seed planting in the row or rows being planted. The user determines these specific intervals according to the dimensions of the field or plot and the desired alley spacing between seeds in a row. Other means for triggering the release of the seed may involve spatial markers/indicators, an electronic triggering mechanisms (i.e., such as those controlled/operated by a spatial coordinate device), or a manual operation to establish intervals for planting by triggering the release of the seed upon the occurrence of each interval. The seed planter may be fitted with one or more sensors to monitor the movement of seed from the dispenser, through the one or more staging assemblies in the seed metering unit and out of the planting unit to verify travel of seed from dispenser 100 to planting unit 300 for planting of the seed.

An alternative embodiment of the present invention is shown in FIG. 1B. The seed planter 10 includes a toolbar 12 and a dispenser 100 attached to toolbar 12. The dispenser 100 is configured to dispense pre-singulated seed and seed metering unit 200 is adapted to stage seed proximate the planting unit 300 to release into the seed intake 302 (shown in FIG. 5C) for planting. In this embodiment, seed planter 10 is again mounted to a conventional toolbar 12. However, the planter could be mounted to any mobile supporting structures including, but not limited to, those already mentioned. As seen in FIG. 1B, a user is able to place seed tray 118 into the dispenser 100 while standing on the loading platform 30. The present invention contemplates an automated seed tray 118 loading/ unloading system configured to handle seed tray 118, load seed tray 118 into dispenser 100 and unload seed tray 118 from dispenser 100. Systems for handling, loading and unloading seed tray 118 are within the scope of the present application, such as for example a robotic arm with a grip that receives instruction from a controller for handling, loading and unloading seed tray 118. Whether manually or by automation, the present invention contemplates the use of a storage bin, holding point and/or structure for keeping a plurality of seed tray 118 proximate dispenser 100, such as for example a cabinet or seed tray storage and dispensing magazine proximate seed dispenser 100 for storing several seed trays 118 in a stacked formation for resource efficient arrangement, handling, loading and unloading of seed tray 118. After the seed is dispensed, the seed travels from the dispenser 100 to seed metering unit 200 through a plurality of conduit 40. The plurality of conduit 40 in the present embodiment comprises flexible PVC hose. Conduit 40 could be transparent tubing or hose for viewing, tracking, handling, and communicating seed between assemblies, subassemblies or components. After the seed has traveled to the seed metering unit 200, the seed is staged proximate to a conventional planting unit 300. Similar to the earlier mentioned embodiment, the seed is released into the seed intake for planting when triggered by a conventional cable winder 400.

Figure 10B:
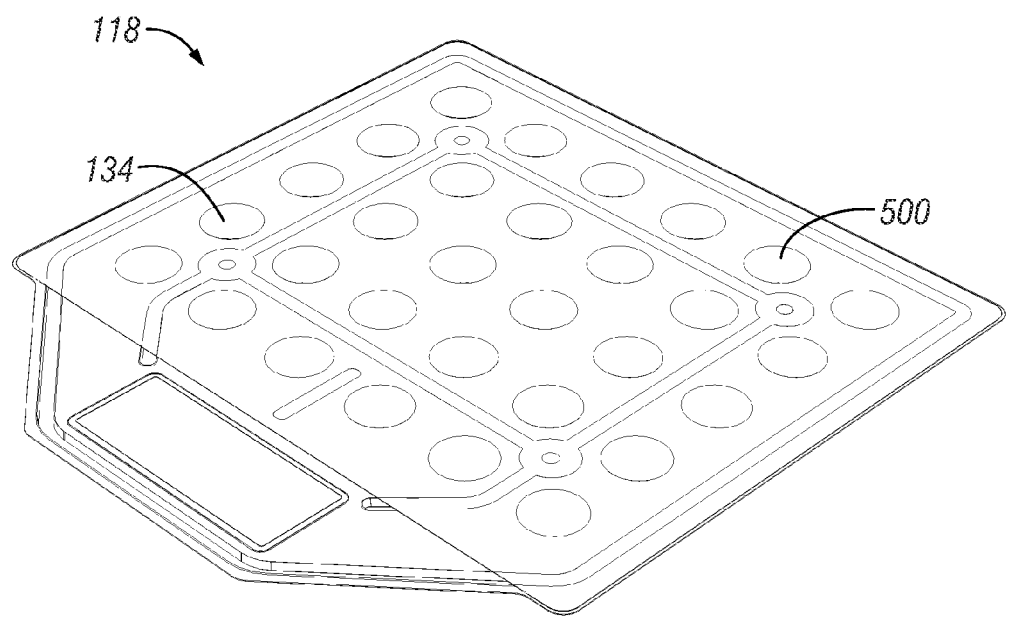
FIG. 10B is a bottom perspective view of the seed carrier shown in FIG. 10A.

For placement of the seed tray 118 into dispenser 100 shown in FIG. 1A, the user pulls outwardly on handle 114 of the seed tray 118 such that the receptacle 116 slides on track 112 and becomes accessible proximate tray 110. In the case for dispenser 100 shown in FIG. 1B, seed tray 118 is inserted into receptacle 116. During dispensing, ram 128 exerts a generally downward force on the press plate 106 and plate 126. As the press 104 travels downward, a locating guide 122 (shown in FIG. 2C) having a plurality of apertures aligns the plurality of pins 124 commensurate with the plurality of wells 134 in the seed tray 118. Additionally, locating guide 122 (shown in FIG. 2C) is adapted to assist in separating, or kicking off, seed tray 118 from the plurality of pins 124 on the press 104. In the case of dispenser 100 shown in FIG. 2F, seed tray 118 is kicked-off or separated from plate 126 with plurality of pins 124 by kick-off pins 174. Spring biased kick-off pins 174 are configured to engage detents 176 in seed tray 118 (as best illustrated in FIG. 10A-B) for separating seed tray 118 from plurality of pins 124 on plate 126 when ram 128 is retracted. Seed dispensed from seed tray 118 travels from the seed tray 118 through a receptacle aperture 130 and corresponding bottom section aperture 132 into a plurality of conduits 40. In this manner, the dispenser 100 ensures each seed remains in singulation while allowing the seed to be identified and its path tracked. As mentioned previously, a dispensed seed travels through a receptacle aperture 130 and a bottom frame aperture 132 into a plurality of conduits 40 which are connected at an opposite end to pre-staging apertures 220 in the manifold 202. For example, a flexible hose may have one end fitted with a threaded male adapter which is then connected to the bottom frame aperture 132. The other end of the PVC hose may be similarly connected to the pre-staging apertures 220. The conduits may be rearrangable relative to the pre-staging apertures in the manifold 222 to reconfigure the arrangement of the batch of pre-singulated seed in seed tray 118 to a desired arrangement in the pre-staging apertures 220 in manifold 222.

Referring now to FIG. 2F, an alternative embodiment of the dispenser 100 is disclosed. In this embodiment, a seed tray 118, such as 30-well seed tray 118 (shown in FIGS. 10A-B), is placed into a receptacle 116. In operation, press 104 travels downwardly to dispense seeds from the seed tray 118. The press 104 includes a ram 128, a plate 126, and pins 124 ganged to plate 126 similar to dispenser 100 shown in FIGS. 2A-E. After the seeds have been dispensed they travel into a plurality of conduit 40.

FIGS. 3A-3E also show a method for dispensing seed 500 from a plurality of dispensers 100 stacked one on top of the other. In an alternative dispenser arrangement then dispenser 100 shown in FIG. 1A, FIGS. 3C-E illustrates the stacking of multiple dispensers 100 one on top of the other. Dispensers 100 have seed 500 within plurality of wells 134. For example, plurality of wells 134 in each dispenser 100 may be loaded with seed 500 beforehand (before or after arranged in a stacked formation with other dispensers 100). With each dispenser 100 having seed 500 within plurality of wells 134, seed 500 can be iterated through each dispenser 100 until dispensed into plurality of conduits 40.

As best illustrated in FIG. 3D, moving slide plate 136 from second position to first position along the direction of the horizontal arrow shown in FIG. 3D, moves each well 134 into communication with aperture 152 in bottom wall 146 thereby releasing seed 500 from dispensers 100 into plurality of conduits 40. Seed batch 500 in the next dispenser 100 (dispenser 100 positioned directly above the bottom-most dispenser 100) is dispensed by shuttling slide plate 136 from the second position to the first position along the horizontal axis as indicated by the horizontal arrow to thereby move each well 134 into communication with aperture 152 in bottom wall 146 of dispenser 100 to move seed 500 through the pair of stacked dispensers 100 and through plurality of conduits 40, as best illustrated in FIG. 3E.

FIGS. 4A-B illustrate another dispenser 100 for dispensing singulated seed from a seed carrier, such as seed tray 118. The method illustrated in FIGS. 4A-B includes the steps of loading seed into the plurality of wells 134 within seed tray 118, covering the plurality of wells 134 in seed tray 118 with a thin slide plate (not shown), inserting seed tray 118 into receptacle tray 168 in dispenser 100, removing or iterating thin slide plate (not shown) for dispensing, iterating seed tray 118 forward toward plurality of apertures 166 in manifold 164 using shuttle 158, and releasing seed from within the plurality of wells 134 in seed tray 118 through plurality of apertures 166 in manifold 164 for dispensing into the plurality of conduit 40. Although not shown, those skilled in the art can appreciate that shuttle 158 could be an automated shuttle. A motor actuator could be configured to rotate shuttle 158 upon receiving an instruction from a control unit such that seed tray 118 is iterated forward toward plurality of apertures 166 in manifold 164. Seed tray 118 is iterated forward using shuttle 158 as seed are moved to a seed metering unit or to the planting unit until seed within the plurality of wells 134 in seed tray 118 are dispensed into the plurality of apertures 166 in manifold 164. Because of the upside down orientation of seed tray 118 relative to manifold 164, seed within plurality of wells 134 in seed tray 118 dispense through plurality of apertures 166 in manifold 164 by gravity. As seed tray 118 is iterated forward, one or more row of wells 134 is moved into communication with one or more row of apertures 166 in manifold 164 such that the seed in the row of wells 134 are dispensed into the row of apertures 166 in communication with plurality of conduit 40 in communication with seed metering unit 200. As previously indicated, seed planter 10 includes a telescoping tubing portion 50 which allows the conduit to remain substantially vertical and the pathway through the conduit to remain unobstructed as the planter encounters contour changes in a field. The telescoping tubing portion 50 in one aspect of the present invention includes undersized tubing received within oversized tubing. The undersized tubing slides in and out of the oversized tubing as the distance between the dispenser 100 and planting unit 200 changes with changes in contour in a field. In a preferred aspect of the present invention, the oversized tubing is PVC pipe and the undersized tubing is flexible polyethylene tubing, both the PVC pipe and the polyethylene tubing are smooth-walled conduits that provide a no hang-up transition of seed from dispenser 100 to seed metering unit 200. Both conduits are sufficiently rigid to allow one to slide in and out of the other without requiring grooves or some other slide control mechanism. The slidable joint/connection formed between the two mating conduits provides an environment free of influences (e.g., static charge build-up) that might otherwise prevent or discourage smooth transition of seed from dispenser 100 to seed metering unit 200. Seed dispensed from dispenser 100 is communicated to seed metering unit 200 through conduit 40.

FIGS. 5A-C illustrate through several exemplary views the seed metering unit 200, specifically, manifold 202, gate 218, rotary seed plate 210, and discharge plate 214. A dispensed seed enters manifold 202, and more specifically a pre-staging aperture 220, and is communicated to rotary seed plate 210 when gate 218 is in an open position and rotary seed plate 210 is in a home position. Gate 218 of the present embodiment is positioned between manifold 202 and rotary seed plate 210. Gate 218 includes a plurality of apertures (not shown) in corresponding pattern with the plurality of pre-staging apertures 220 in manifold 202. Gate 218 is moveable between an open position and closed position by way of an actuator, which in a preferred embodiment is slide gate cylinder 216. When gate 218 is an open position, manifold pre-staging apertures 220 are in communication with the staging apertures 224 in rotary seed plate 210 and seed is allowed to move there-through. When gate 218 is not in an open position the seed is pre-staged such that it rests on gate 218 proximate rotary seed plate 210. The actuation of slide gate cylinder 216 is triggered by cable winder 400, as previously indicated, which is setup according to the user defined alley spacing.

FIGS. 6A-6E illustrate a method for metering seed by way of seed metering unit 200. The method includes the steps of receiving a plurality of seed through plurality of seed tubes 250 in seed manifold 256. Seed received through seed tubes 250 is staged within seed manifold 256 above slide gate 274. Slide gate 274 includes a plurality of apertures patterned commensurate with the plurality of seed tube 250 in seed manifold 256 and plurality of staging apertures 270 in rotary seed plate 268. By moving slide gate 274, the plurality of apertures within slide gate 274 are brought into communication with the plurality of seed tubes 250 in seed manifold 256 and the plurality of staging apertures 270 in rotary seed plate 268. By gravity, seed staged in seed manifold 256 moves through apertures in slide gate 274 and into staging apertures 270 in rotary seed plate 268. Slide gate 274 may be closed so that a second batch of seed may be dispensed and received in the plurality of seed tube 250 and staged within seed manifold 256 above slide gate 274 with the first batch of seed being staged within staging apertures 270 in rotary seed plate 268. Drive shaft 252 is driven at an RPM commensurate with a ground speed of the planting unit such that one of the pluralities of staging apertures 270 is brought into communication with seed dispensing aperture 264 in mounting plate 258. Gravity moves the seed out of the staging aperture 270 in rotary seed plate 268 through seed dispensing aperture 264 in seed intake 262. The seed is then transferred through planting arm 260 in planting unit 300 for planting.

FIGS. 7A-E illustrate a method for metering seed using seed metering unit 200. A batch of seed are received through the plurality of seed tubes 278 in seed manifold 298 and staged within seed manifold 298 above slide gate 280. When slide gate 280 is open, seed staged within the plurality of seed tubes 278 in seed manifold 298 move through seed manifold 298 into a plurality of staging apertures 290 in rotary seed chain 284 in communication with plurality of seed tubes 278 in seed manifold 298. Rotation of drive 286 imparts rotation to one or both gears 288 for rotating rotary seed chain 284 which moves consecutive seed towards seed intake 262 in planting arm 260. Upon rotation of staging aperture 290 in rotary seed chain 284 past the horizontal position and into a downward vertical position, gravity moves the seed out of the staging aperture 290 in rotary seed chain 284 and into seed intake 262 in planting arm 260. Like seed metering unit 200 illustrated in FIGS. 6A-E, seed metering unit 200 illustrated in FIGS. 7A-E allows for staging of multiple batches of seed. For example, one batch of seed may be staged within staging apertures 290 in rotary seed chain 284 while another batch of seed may be staged in seed tubes 278 in seed manifold 298 above slide gate 280. In this manner, a batch of seed is always kept adjacent or proximate seed intake 262 of planting unit 300 to limit the amount of time and travel needed for moving a single seed to the planting unit 300 for planting.

FIGS. 8A-D illustrate another exemplary method for metering seed using seed metering unit 200. The method illustrated in FIGS. 8A-D includes staging a batch of seed in plurality of seed tubes 278 in seed manifold 298. Opening slide gate 280 allows plurality of seed tube 278 to be in communication with plurality of staging apertures 290 in rotary seed belt 292. By gravity, seed is moved through plurality of seed tubes 278 and then into plurality of staging apertures 290 in rotary seed belt 292. Rotation of drive 286 attached to one or both gears 288 causes rotary seed belt 292 to rotate thereby iterating or moving seeds forward toward seed intake 262 in planting arm 260 of planting unit 300. Single seed staged in each staging aperture 290 in rotary seed belt 292 releases from staging aperture 290 and falls into seed intake 262 in planting arm 260 for planting. Drive 268 is rotated at an RPM commensurate with the ground speed of planter 10. Like the aforementioned embodiments of seed metering unit 200, seed metering unit 200 illustrated in FIGS. 8A-D is configured so that batches of seed may be staged or pre-staged proximate planting unit 300. For example, one batch of seed may be staged within plurality of staging apertures 290 in rotary seed belt 292 while another batch of seed may be staged in plurality of seed tubes 278 in seed manifold 298 when slide gate 280 is closed. Rotating rotary seed belt 292 causes single seed within staging apertures 290 in rotary seed belt 292 to be moved into position above seed intake 262. Seed are released into seed intake 262 when staging aperture 290 is rotated downward toward seed intake 262. Thus, gravity acting on individual or single seed in staging aperture 290 moves seed out of staging aperture 290 and into seed intake 262 for planting. The next batch of seed staged in seed manifold 298 may be moved into plurality of staging apertures 290 in rotary seed belt 292 upon activation or movement of slide gate 280 to the open position when plurality of staging apertures 290 in rotary seed belt 292 are empty.

In an exemplary embodiment, the seed planter 10 utilizes a controller in communication with the various actuators and mechanism to control their operation. The controller may be configured to be in communication with user interface 14 to alert an operator of the status of the dispenser 100, seed planter 10, rotary seed plate 224, servomotor 208, slide gate cylinder 216, cable winder 400, speed of planter 10, a spatial/ geospatial positioning system (GPS) and/or other location determining devices, and/or identification of tray 118 from a barcode reader, RFID tag, a label, a sticker, an inscription, an optical character, or other scannable or readable labels. The controller may also be configured to provide an instruction to: actuator 138 in dispenser 100 for extending or retracting ram 128 (see FIGS. 2A and 2F); shuttle 158 for iterating/moving seed tray 118 (see FIGS. 4A-B); slide gate cylinder 216 for extending or retracting slide gate 218 (see FIG. 5B); servomotor 208 for rotating rotary seed plate 210 (see FIG. 5A); actuator (not shown) for shuttling slide plate 136 back and forth (see FIGS. 3A-E); motor (not shown) for turning drive shaft 252 rotating rotary seed plate 268 (see FIG. 6E); motor (not shown) for turning drive 286 rotating rotary seed chain 284 (see FIG. 7A); and, motor (not shown) for turning drive 286 rotating rotary seed belt 292 (see FIG. 8D). The controller may include or be in communication with, whether by wire or wirelessly, a data store in communication with a spatial recognition device to record spatial information associated with each planted seed. The controller may be configured to correlate time-date stamps with the spatial information for each planted seed and make a record in the data store. As a result, each planted seed is correlated with its previous position in the batch of pre-singulated seed in the seed tray to provide a map of the plantings, including seed type and characteristics of the planted seed, by correlation to information known about the seed before planting and associated with the position of each seed in the seed tray. The use of time-date stamps are further contemplated for use in tracking each planted seed for field mapping purposes. In one example, time-date stamps for each planting event could be recorded and stored in a database or data store. Here, the planting event is the moment in time when the hole in the seed plate is directly over top of the seed intake of the planting unit, thus inferring that the seed has dropped through the seed tube and into the ground, and as such is planted. Using the time-date stamps for when the hole (having a seed) is directly overtop the seed intake, real-time and post processing can use the recorded time-date stamps for generating spatial information about the seeds planted. Tying the time-date stamps information with spatial coordinates provided by a spatial recognition device would also allow real-time and/or post processing to provide a field map of the plantings. Alternatively, a geospatial reference could be recorded at the beginning and/or ending of planting a row, field or plot. Using time-date stamps for each planting event, real-time and/or post processing could provide a field map using the geospatial reference points, information about the speed of planting implement, and time-date stamps for the planting events. The present invention also contemplates that marker seeds could be implemented into the seed tray 118 for providing a fixed geospatial reference within the field. For example, in the case where seed tray 118 has 30 seeds in each row, every 5$^{th}$ seed in the row could be a marker seed. Using the planter of the present invention, the same seed pattern existing in seed tray 118 exists in the field after planting. Thus, one could reenter the field some time after planting and record range, plot and quadrant information to ascertain spatial coordinates for each plant in the field. This would obviate the usual reliance on physical tags on the plant used to track information about the plant, such as height, date of flowering, tasseling, etc. The seed planter 10 may also include, as previously indicated, a sensor to monitor travel of seed through the dispenser 100, conduit 40 and seed metering unit 200. Further, a sensor may be disposed at dispenser 100 to discern a representation of information on each seed tray 118 to store or recall information from the data store relating to the batch of pre-singulated seed in the seed tray, such as for example perception of an identification of tray 118 from a barcode reader, RFID tag, a label, a sticker, an inscription, an optical character, or other scannable or readable labels. Information about seed tray 118 and/or seed within seed tray 118 may be uploaded to data store from a central database or server, whether a local or global server. Finally, the aforementioned controllers may be in communication, whether by wire or wirelessly, with the aforementioned sensors to operate a number of controls, including but not limited to the aforementioned controls, associated with the seed planter 10 based on the information associated with the seed information or information recalled from the data store.

System

The present invention contemplates a seed planter system for planting singulated seed according to a defined seed planting arrangement. The system includes means for carrying singulated seed and means for dispensing singulated seed configurable to either dispense singulated seed arranged according to the defined seed planting arrangement or dispense and reconfigure singulated seed according to the defined seed planting arrangement or some other arrangement.

Initially, the system of the present invention has for its main focus the singulating and arranging of seed within plurality of wells 134 in seed tray 118 according to information associated with or known about the seed and a desired seed planting arrangement. The arrangement of seed within seed tray 118 is accomplished by using information known about the seed to populate seed tray 118 commensurate with a desired seed planting arrangement to provide a field layout of the position of each seed planted in the field by referencing back to seed tray 118 or information recorded about each planting, such as date, time and location, in data store. Referring now to FIGS. 9A, 9B, 10A, and 10B, seed is arranged within the respective seed tray 118 according to a desired planting arrangement. Different varieties of seed may be disposed within seed tray 118 according to a desired planting arrangement. For example, a desired planting arrangement may necessitate that rows of seeds be separated by buffer zones composed of a different type of plant. The seeds of the different plant can be populated within seed tray 118 to provide the desired planting arrangement. After seed is populated within seed tray 118, the present invention contemplates a system wherein seed is dispensed from seed tray 118 and provided at seed planting unit 300 on seed planter 10 for planting commensurate with the desired seed planting arrangement and in accordance with the field layout. Management of seed movement through and position within planting unit 10 is accomplished in an accurate and precise manner by limiting the travel distance and time for seed movement and planting upon receipt of planting instructions. A means for dispensing singulated seed configurable to either dispense singulated seed arranged according to the defined seed planting arrangement or dispense and reconfigure singulated seed according to the defined seed planting arrangement or some other arrangement is provided in FIGS. 2A-2F. It can be seen in this embodiment that seed is dispensed from seed tray 118 within dispenser 100 according to a defined seed planting arrangement.

The exemplary embodiments of the present invention have been set forth within the drawings and in the foregoing description and although specific terms are employed, these are used in the generically descriptive sense only and not used for the purposes of limitation. Changes in the formed proportioned of parts as well as in the substitution of equivalents are contemplated as circumstances may suggest or are rendered expedient without departing from the spirit and scope of the invention as further defined in the following claims.

What is claimed is:

1. A seed planter comprising:
   a mobile supporting structure;
   a planting assembly operatively attached to the mobile supporting structure;
   a dispensing assembly operatively attached to the mobile supporting structure; and
   a metering assembly operatively attached to the mobile supporting structure, the metering assembly comprising:
   a) seed staging components comprising a pre-staging assembly that includes separated seed pre-staging positions for pre-staging a batch of singulated seed, and a separate staging assembly that includes separated seed staging positions for staging a batch of singulated seed.

2. The seed planter of claim 1 wherein the metering assembly further comprises seed transitioning components in combination with the seed staging components for transitioning the batch of singulated seed through the seed staging components for release into the planting assembly.

3. The seed planter of claim 2 wherein the seed transitioning components comprise a gate moveable by an actuator between an open and closed position for transitioning seed through seed staging components.

4. The seed planter of claim 1 wherein the seed staging components comprise one or more seed staging members comprising pre-staging or staging apertures to hold the batch of singulated seed in singulated form.

5. The seed planter of claim 4 wherein one of the seed staging members comprise a rotary seed plate wherein the staging apertures converge to a common radius that intersects an upward facing seed intake of the planting assembly.

6. A seed planter comprising:
   a mobile supporting structure;
   a planting assembly operatively attached to the mobile supporting structure;
   a dispensing assembly operatively attached to the mobile supporting structure for dispensing a batch of seed; and
   a metering assembly operatively attached to the mobile supporting structure, the metering assembly comprising:
   a) seed staging components comprising separated seed pre-staging and staging positions for pre-staging and staging pre-specified counts of seed separated from other counts in the batch and maintaining separation of the pre-specified counts of seed from other counts in the batch for planting.

7. The seed planter of claim 6 wherein the metering assembly further comprises seed transitioning components in combination with the seed staging components for transitioning the pre-specified counts of seed through the seed staging components for release into the planting assembly.

8. The seed planter of claim 6 wherein the seed staging components comprise a seed staging member having a plurality of apertures to hold the specified counts of seed separate from other counts.

9. A seed planter having a planting assembly with a seed intake, the seed planter for use in combination with a multi-well seed carrier adapted for holding a batch of singulated seed, the seed planter comprising:
   a mobile supporting structure;
   a dispensing assembly operatively attached to the mobile supporting structure, the dispensing assembly comprising a seed dispenser adapted for receipt of a multi-well seed carrier and for dispensing seed from the seed carrier; and
   a seed metering assembly comprising:
   a) one or more seed staging components comprising a pre-staging assembly that includes separated seed pre-staging positions for pre-staging one or more batches of singulated seed, and a separate staging assembly that includes separated seed staging positions for staging the one or more batches of singulated seed; and
   b) one or more seed transitioning components in combination with the seed staging components for transitioning singulated seed through seed staging components to provide sequenced communication of seed into the seed intake for planting.

10. The seed planter of claim 9 wherein the seed dispenser comprises means for separating seed from wells in the seed carrier.

11. The seed planter of claim 9 further comprising a plurality of conduits operatively connected between the dispensing assembly and planting assembly.

12. A method for planting seed comprising:
   providing a seed planter comprising a planting assembly, a dispensing assembly and a metering assembly operatively attached to a mobile supporting structure;
   loading the dispensing assembly with a batch of seed comprising one or more sets of pre-specified counts of seed separated from other counts in the batch;
   dispensing the pre-specified counts of seed in the batch from the dispensing assembly;
   pre-staging the pre-specified counts of seed in a pre-staging assembly, and staging the pre-specified counts of seed in a staging assembly, to maintain separation of the specified counts of seed through the metering assembly; and
   planting the specified counts of seed with the planting assembly.

13. The method of claim 12 wherein the specified counts of seed in the batch are held separate from other counts in the batch in wells of a multi-well seed carrier.

14. The method of claim 12 wherein the dispensing step comprises separating a batch of pre-specified counts of seed from wells in a multi-well seed carrier collectively, sequentially or randomly according to a desired planting arrangement.

15. The method of claim 12 further comprising staging the pre-specified counts of seed in separated seed staging and/or pre-staging positions at the metering assembly.

16. A method for planting seed from a multi-well seed carrier adapted for holding a batch of pre-singulated seed, the method comprising:
   providing a seed planter comprising a dispensing assembly and a planting assembly operatively attached to a mobile supporting structure;
   loading a seed carrier holding a batch of pre-singulated seed into the dispensing assembly;
   dispensing singulated seed from individual wells in the seed carrier;
   pre-staging the singulated seed in a pre-staging assembly;
   staging the seed in separated seed staging positions before planting; and metering singulated seed through separated seed staging positions into the planting assembly for planting.

17. The method of claim 16 further comprising providing an instruction to one or more staging members or gates from a controller receiving input from a cable winder or spatial recognition device for transitioning seed through the staging members into the planting assembly for planting.

18. The method of claim 17 further comprising recording in a data store time-date stamps or spatial information associated with the instruction and mapping plantings based on time-date stamps or spatial information in the data store.

19. A seed planter system comprising:
 planting means for planting seed;
 seed carrying means for carrying seed in singulated form;
 dispensing means for dispensing singulated seed from seed carrying means; and
 staging means for staging multiple batches of singulated seed or specified counts of seed separate from other counts at the planting means, said staging means comprising means for pre-staging the multiple batches of singulated seed or specified counts of seed, and means for staging the multiple batches of singulated seed or specified counts of seed.

20. The seed planter system of claim 19 wherein said dispensing means comprises a seed dispenser having one or more actuated members for dispensing singulated seed or specified counts of seed from the seed carrying means.

21. The seed planter system of claim 19 wherein the staging means comprises one or more staging members having separated seed staging positions for staging singulated seed or specified counts of seed separate from other counts of seed.

22. The seed planter system of claim 19 wherein the staging means further comprises transitioning means for controlling travel of the singulated seed or the specified counts of seed separate from other counts of seed through the staging means.

* * * * *